(12) United States Patent
Miyoshi et al.

(10) Patent No.: US 6,192,770 B1
(45) Date of Patent: Feb. 27, 2001

(54) SHIFT SELECT LEVER DEVICE FOR MANUALLY-SHIFTABLE AUTOMATIC TRANSMISSION

(75) Inventors: Keisuke Miyoshi; Fumihiko Hiasa, both of Hiroshima (JP)

(73) Assignees: Mazda Motor Corporation; Delta Kogyo Co. Ltd., both of Hiroshima (JP)

( * ) Notice: Subject to any disclaimer, the term of this patent is extended or adjusted under 35 U.S.C. 154(b) by 0 days.

(21) Appl. No.: 09/247,090

(22) Filed: Feb. 9, 1999

(30) Foreign Application Priority Data

Feb. 10, 1998 (JP) .................................. 10-044709

(51) Int. Cl.⁷ .................................. F16H 59/02
(52) U.S. Cl. .................................. 74/473.18; 74/473.15
(58) Field of Search .................. 74/473.18, 335, 74/473.11, 473.1, 473.33, 473.15

(56) References Cited

U.S. PATENT DOCUMENTS

| | | | |
|---|---|---|---|
| 5,044,220 | * | 9/1991 | Raff et al. ............................ 74/335 X |
| 5,090,540 | * | 2/1992 | Hasegawa et al. ................. 74/335 X |
| 5,205,180 | * | 4/1993 | Moroto et al. ..................... 74/335 X |
| 5,249,478 | * | 10/1993 | Moroto et al. ..................... 74/473.18 |
| 5,689,996 | * | 11/1997 | Ersoy ............................. 74/473.18 X |
| 5,819,591 | * | 10/1998 | Meyer ................................. 74/473.18 |
| 5,870,929 | * | 2/1999 | Bravo ............................. 74/473.16 X |

FOREIGN PATENT DOCUMENTS

| | | |
|---|---|---|
| 40 35 747 A 1 | 5/1991 | (DE) . |
| 44 26 207 C 1 | 8/1995 | (DE) . |
| 0 754 884 A2 | 1/1997 | (EP) . |
| 0770 799 A2 | 5/1997 | (EP) . |
| 7-280072 | 10/1995 | (JP) . |

* cited by examiner

*Primary Examiner*—Richard M. Lorence
*Assistant Examiner*—Ankur Parekh
(74) *Attorney, Agent, or Firm*—Nixon Peabody LLP; Donald R. Studebaker

(57) ABSTRACT

A shifting arrangement for an automatic transmission with manual gear shift feature has a control member which is operative to connect and disconnect operational linkage between a shift lever and a shift cable connected to a manual valve in a hydraulic control circuit. The control member is supported to slide relatively to the shift lever while the shift lever is operated between driving positions including an automatic gear shift selecting position so as that the shift lever remains operationally connected to the shift cable and is coupled to the shift lever when the shift lever is moved in the transverse direction from the automatic gear shift selecting position to a manual gear shift selecting position so as to operationally disconnect the shift lever from the shift cable. The shift lever is movable relative to the control member in the transverse direction when the control member is connected to the shift cable.

10 Claims, 19 Drawing Sheets

SHIFT SELECT LEVER DEVICE FOR MANUALLY-SHIFTABLE AUTOMATIC TRANSMISSION

BACKGROUND OF THE INVENTION

1. Field of the Invention

This invention relates to a shifting arrangement for an automatic transmission of a motor vehicle, and more particularly, to an automatic transmission shifting arrangement which has a cable connecting a shift lever and a manual valve in a hydraulic control circuit to shirt the manual valve according to ranges selected by the driver through the shift lever.

2. Description of Related Art

In recent years, automatic transmissions of a motor vehicle of the type which permits a manual choice of gears in addition to automatic gear selection have been put into practical use. Such an automatic transmission automatically selects gears according to driving conditions in the automatic gear selection range and is manually shifted to intended gears selected by the driver through a shift lever. One of the automatic transmissions of this kind is known from, for example, Japanese Patent Application, laid-open to the public as Japanese Unexamined Patent Application No.7-280072. The automatic transmission described in the above mentioned publication has two shifting paths or channels for a shift lever, namely a first or range shifting channel for selecting the driving positions such as drive (D), neutral (N), reverse (R) and parking (P) positions and a second or gear shifting channel in which the shift lever can take three manual positions, namely a holding (M) position, an up-shift position and a down-shift position on opposite sides of the holding (M) position. These range and gear shifting channels extend parallel to each other in a longitudinal direction of the motor vehicle and are connected by means of a connecting channel through which the shift lever is movable between the first or range shifting channel and second or gear shifting channel.

This type of automatic transmission generally incorporates a plurality of hydraulically operated friction coupling elements such as clutches and brakes which are selectively engaged or disengaged to change a power transmission path between an engine and driving wheels and a manual valve (range shifting valve) disposed in a hydraulic control circuit operative to control supply of hydraulic pressure to and release of hydraulic pressure from the friction coupling elements so as to switch driving positions from one range to another range. The shift valve and shift lever are connected to each other by means of a shifting cable. In the range shifting channel, by way of the shifting cable, swivel movement of the shift lever is transmitted to the manual valve to shift it, thereby providing a hydraulic pressure line in the hydraulic control circuit leading to specific friction coupling elements necessary to achieve a driving position selected by the shift lever. In the case where the automatic transmission equipped with the manual gear shifting feature is provided parallel shifting channels for range and gear selection, respectively, swivel movement of the shift lever is made in the same direction in the gear shifting channel as in the range shifting channel, so that the manual valve is moved through the shifting cable even during manual gear shifting, which leads not only to heavy swivel operation of the shift lever for a manual up- or down-shift, and hence aggravation of a feeling of operation of the shift lever but to an apprehension of a deviation from a proper hydraulic pressure line for the preselected range due to movement of the manual valve. For example, in the case where the neutral (N) position is ahead of the drive (D) range selecting position in the range shifting channel and the up-shift position is ahead of the holding (M) position in the gear shifting channel, the shift lever is required to swivel in the same direction to select the neutral (N) range and to manually shift up the automatic transmission. In consequence, during manually shifting up the automatic transmission, the manual valve tends to open a hydraulic pressure line leading to a friction coupling element for achieving the neutral (N) range from a hydraulic pressure line leading to a friction coupling element for achieving the drive (D) range with an effect of causing a drop in the level of hydraulic pressure or a lack of hydraulic pressure to the latter friction coupling element.

In order to eliminate the disadvantage described above, the automatic transmission described in the above mentioned publication incorporates a mechanism for disconnecting the linkage between the shift lever and the manual valve by way of the shifting cable when the shift lever is swivelled from the range shifting channel at the drive (D) range selecting position into the gear shifting channel and reviving the linkage between the shift lever and the manual valve by way of the shifting cable when the shift lever is swivelled from the gear shifting channel at the holding (M) position into the range shifting channel.

An immanent problem in the automatic transmission described above in which connection and disconnection of transfer of movement of shift lever to the shifting cable is caused directly by movement of the shift lever between the D and M positions is that, even while the shift lever remains in the range shifting channel to select positions other than D and M positions, if the shift lever receives load in the transverse direction as strong as it is forced in the same direction, the shift lever is operationally disconnected from the shifting cable with a result of making the manual valve in the hydraulic control circuit inoperative.

SUMMARY OF THE INVENTION

It is accordingly an object of the invention to provide a shifting arrangement for a manually shiftable automatic transmission having a shifting cable operationally linking a shift lever and a manual valve installed in a hydraulic control circuit which aptly prevents disconnection of the operational linkage between the shift lever and manual valve while the shift lever is in the range shifting channel to select positions other than D and M positions even upon an occurrence movement of the shift lever like movement between the D and M positions which disconnects the operational linkage between the shift lever and manual valve.

The foregoing object of the invention is accomplished by providing a shifting arrangement having a shift lever pivoted on a stationary base member to swivel in first and second directions perpendicular to each other for selecting a plurality of automatic driving positions including at least an automatic gear shift selecting position for automatically shifting the automatic transmission to forward gears according to scheduled shift patterns and a manual gear shift selecting position for manually shifting the automatic transmission one gear step-by-step, the shift lever being swiveled in the first direction to select the automatic driving positions, swiveled in the second direction to switch the automatic transmission between the manual gear shift selecting position and the automatic gear shift selecting position and further swiveled in the first direction in the manual gear shift preselecting position to manually shift the automatic transmission. The shifting arrangement includes a valve operative to control a hydraulic control circuit according to the automatic driving positions and the manual gear shift selecting position, a shifting cable installed between the shift lever and the valve operative to transfer swivel movement of the shift lever in the first direction to the valve, and a control member movable between a connecting position in which the control member connects the transfer of swivel movement of the shift lever in the first direction to the valve and a disconnecting position in which the control member disconnects the transfer of swivel movement of the shift lever in the first direction to the valve, the control member being kept in the connecting position while the shift lever selects positions other than the automatic gear shift selecting position and the manual gear shift selecting position and moved to the disconnecting position following swivel movement of the shift lever in the second direction to the manual gear shift selecting position from the automatic gear shift selecting position and to the connecting position following swivel movement of the shift lever in the second direction to the automatic gear shift selecting position from the manual gear shift selecting position. The term "automatic driving positions" as used herein shall mean and refer to operating positions for selecting parking range, reverse range, neutral range and drive or automatic gear shift selecting range.

The shifting arrangement may further include position detection means actuated by movement of the control member to the disconnecting position for detecting the shift lever in the manual gear shift selecting position.

The shifting arrangement may further include a restraint member secured to the base member. In the shifting arrangement, the control member is supported for slide movement in the second direction relatively to the shift lever, and the restraint member restrains slide movement of the control member in the second direction directed toward the manual gear shift selecting position so as to force the control member relatively to the shift lever when the shift lever is swiveled in the second direction from any one of the positions other than the automatic gear shift selecting position and the manual gear shift selecting position, thereby holding the control member in the connecting position and allowing the control member to move in the second direction following swivel movement of the shift lever when the shift lever is swiveled in the second direction between the automatic gear shift selecting position and the manual gear shift selecting position so as thereby to move the control member between the connecting position and the disconnecting position.

The shifting arrangement may further include biasing means for urging the control member toward the manual gear shift selecting position from the automatic gear shift selecting position and restraint means provided on the shift lever for preventing movement of the control member toward the manual gear shift selecting position against the biasing means. In the shifting arrangement, the control member is moved to the disconnecting position following swivel movement of the shift lever in the second direction to the manual gear shift selecting position from the automatic gear shift selecting position and to the connecting position following swivel movement of the shift lever in the second direction to the automatic gear shift selecting position from the manual gear shift selecting position.

Further, the shifting arrangement may further include first swivel bracket means supported by the base member for swiveling in the first direction only, second swivel bracket means supported by the first swivel bracket means for swiveling relatively to the first swivel bracket means in the second direction and a cable fixedly connected to the first swivel bracket means. In the shifting arrangement, the shift lever and the control member are supported by the first swivel bracket means separately from each other so as to swivel relatively to the second swivel bracket means in the second direction and swivel together with the second swivel bracket means in the first direction, and the control member is supported at a plurality of points in the second direction by the second swivel bracket means. The second swivel bracket means may be provided with a first risen wall section and a second risen wall section narrower in width than the first risen wall section, and the control member may be formed with a first opening in which the first risen wall section is received to slide in the second direction and a second opening narrower than the first opening and extending continuously from the first opening in the second direction in which the first risen wall section is received to slide in the second direction.

Otherwise, the shifting arrangement may still further include a first swivel bracket pivotally supported on the base member to swivel relatively to the base member in the first direction, a second swivel bracket pivotally supported on the first swivel bracket to swivel relatively to the first swivel bracket in the second direction and supporting separately the sift lever and the control member thereon in such a manner that the shift lever and the control member are always operationally integrated with the second swivel bracket in the first direction but allowed to separately swivel and slide relatively to the first and second swivel brackets in the second direction, respectively, and a cable fixedly connected to the first swivel bracket. In the shifting arrangement, the control member couples the first swivel bracket together with the second swivel bracket while being in the connecting position so that the shift lever, the control member and the first and second swivel brackets swivel as one whole in the first direction.

The shifting arrangement has a shifting channel which guides the shift lever in the first and second directions to situate the shift lever in the automatic driving positions including a parking range selecting position, a reverse range selecting position and a neutral range selecting position in addition to the automatic gear shift selecting position and the manual gear shift selecting position and is configured to define the parking range selecting position, the neutral range selecting position and the automatic gear shift selecting position in a same position in the second direction and in that order in the first direction, and the reverse range selecting position between the automatic gear shift selecting position and the manual gear shift selecting position in the second direction and between the parking range selecting position and the neutral range selecting position in the first direction and includes a guide path extending in the second direction from the parking range selecting position and having a length equal to a distance between the automatic gear shift selecting position and the manual gear shift selecting position for guiding the shift lever in the second direction before situating the shift lever in the parking range selecting position.

According to another aspect of the invention, the shifting arrangement for an automatic of the type having a shift lever pivoted on a stationary base member to swivel in first and second direction perpendicular to each other for selecting a plurality of automatic driving positions including at least an automatic gear shift selecting position for automatically shifting the an automatic transmission to forward gears according to scheduled shift patterns and a manual gear shift selecting position for manually shifting the automatic transmission one gear step-by-step, in which the shift lever is swiveled in the first direction to select the automatic driving positions, swiveled in the second direction to switch the automatic transmission between the manual gear shift selecting position and the automatic gear shift selecting position and further swiveled in the first direction in the manual gear shift selecting position to manually shift the automatic transmission, comprises a valve operative to control a hydraulic control circuit according to the automatic driving positions and the manual gear shift selecting position, a shifting cable installed between the shift lever and the valve operative to transfer swivel movement of the shift lever in the first direction to the valve, a control member movable between a connecting position in which the control member connects the transfer of swivel movement of the shift lever in the first direction to the valve and a disconnecting position in which the control member disconnects the transfer of swivel movement of the shift lever in the first direction to the valve, and position detection means for detecting the shift lever in the manual gear shift selecting position. In the shifting arrangement, the control member is kept in the connecting position while the shift lever selects positions other than the automatic gear shift selecting position and the manual gear shift selecting position and is moved to the disconnecting position following swivel movement of the shift lever in the second direction to the manual gear shift selecting position from the automatic gear shift selecting position and to the connecting position following swivel movement of the shift lever in the second direction to the automatic gear shift selecting position from the manual gear shift selecting position, and the position detection means is actuated by movement of the control member to the disconnecting position to detect the shift lever. The shifting arrangement has a shifting channel which guides swivel movement of the shift lever in the first and second directions to situate the shift lever in the automatic driving positions including a parking range selecting position, a reverse range selecting position and a neutral range selecting position in addition to the automatic gear shift selecting position and in the manual gear shift selecting position and is configured to define the parking range selecting position, the neutral range selecting position and the automatic gear shift selecting position in a same position in the second direction and in that order in the first direction, and the reverse range selecting position between the automatic gear shift selecting position and the manual gear shift selecting position in the second direction and between the parking range selecting position and the neutral range selecting position in the first direction and include a guide path which extends in the second direction from the parking range selecting position and has a length equal to a distance between the automatic gear shift selecting position and the manual gear shift selecting position to guide the shift lever in the second direction before situating the shift lever in the parking range selecting position.

With the shifting arrangement of the invention of the type having the shift lever operative to swivel in the first direction for selecting a plurality of the automatic driving positions including the automatic gear shift selecting position arranged in the first direction and to swivel in the second direction for selecting the manual gear shift selecting position for manually shifting the automatic transmission one gear step-by-step, the control member is kept in the connecting position in which it connects the transfer of swivel movement of the shift lever to the manual valve while the shift lever is in the automatic driving positions, so as to shift the manual valve following the swivel movement of the shift lever in the first direction. When the shift lever is swiveled in the second direction to the manual gear shift selecting position from the automatic gear shift selecting position, the control member is moved into the disconnecting position in which it disconnects the transfer of swivel movement of the shift lever to the valve, the manual valve is not shifted even when the shift lever is swiveled in the first direction to shift the automatic transmission one gear up or down. This prevents the hydraulic control circuit from changing an oil distribution pattern for the forward gears to an oil distribution pattern for, for example, the neutral range and prevents aggravation of swivel operation of the shift lever. While the shift lever remains in the automatic driving positions, swivel movement of the shift lever in the second direction is never accompanied by slide movement of the control member from the connecting position to disconnecting position, which is desirable for avoiding bending and/or damages of the control member.

Because the control member is supported for slide movement in the second direction relatively to the shift lever, it is easy to operationally couple the control member and the shift lever together and to uncoupled them from each other. In consequence, the control member is independent from swivel movement in the second direction of the shift lever while the shift lever is out of the automatic gear shift selecting position and the manual gear shift selecting position, and moves following swivel movement in the second direction of the shift lever while the shift lever is in the automatic gear shift selecting position and the manual gear shift selecting position. The control member is urged toward the manual gear shift selecting position from the automatic gear shift selecting position by the biasing means, and the shift lever is prevented from forcing the control member toward the manual gear shift selecting position from the automatic gear shift selecting position. That is, while the control member slides in the second direction following swivel movement of the shift lever, it stays in the connecting position while remaining situated in the connecting position even though the shift lever swivels. The control member operationally couples the second swivel bracket means to the first swivel bracket means with the shifting cable fixedly connected thereto while it is in the connecting position and uncouples the former from the later while it is in the disconnecting position. Accordingly, operational connection and disconnection between the shift lever and the manual valve are reliably achieved.

In the case where the shift arrangement includes the first and second swivel bracket means for supporting the shift lever for swivel movement in both first and second directions, because the control member is supported at a plurality of positions in the second direction on the second swivel bracket means, the control member is prevented from bending due to a stress on a swivel axis of the shift lever when it hits the first swivel bracket means. The control member is adapted to be brought into engagement with the second swivel bracket as a result of slide movement, which provides a simple support structure for supporting the control member for slide movement on the second swivel bracket means.

The shifting channel defines positions for all available ranges including the automatic gear shift selecting position and the manual gear shift selecting position in both the first and second directions and is configured such that the shift lever takes a guide path extending in the second direction and having a length equal to a distance between the automatic gear shift selecting position and the manual gear shift selecting position before reaching the parking range selecting position. Although the shift lever is swiveled in the second direction to select one of the automatic driving positions arranged in the first direction, the control member is held in the connecting position always while the shift lever is in the automatic driving positions, so that the shift lever remains operationally connected to the shifting cable even during swivel movement in the second direction from the parking range selecting position.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 2:
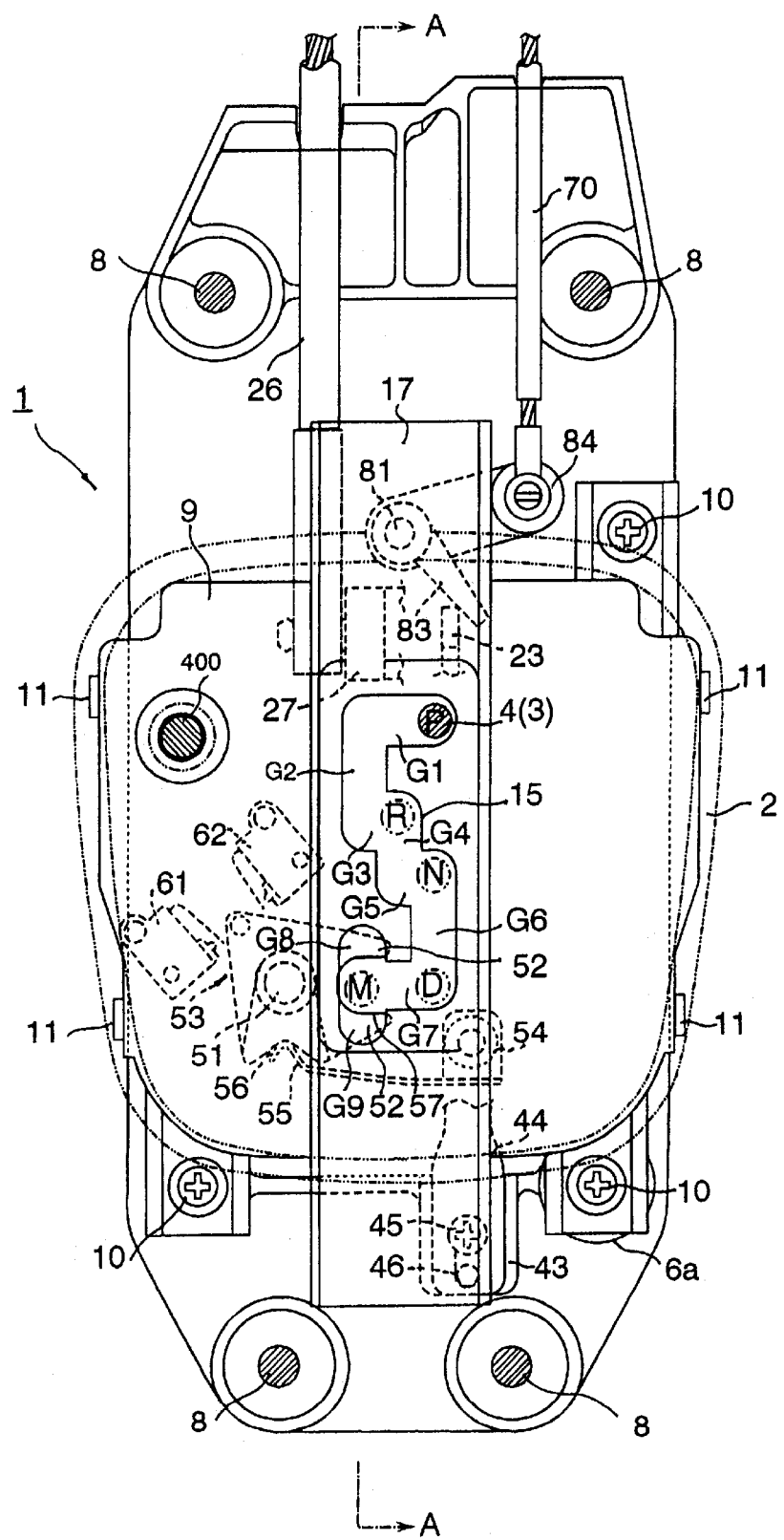
FIG. 2 is a plan view of the automatic transmission shifting arrangement.
Figure 3:
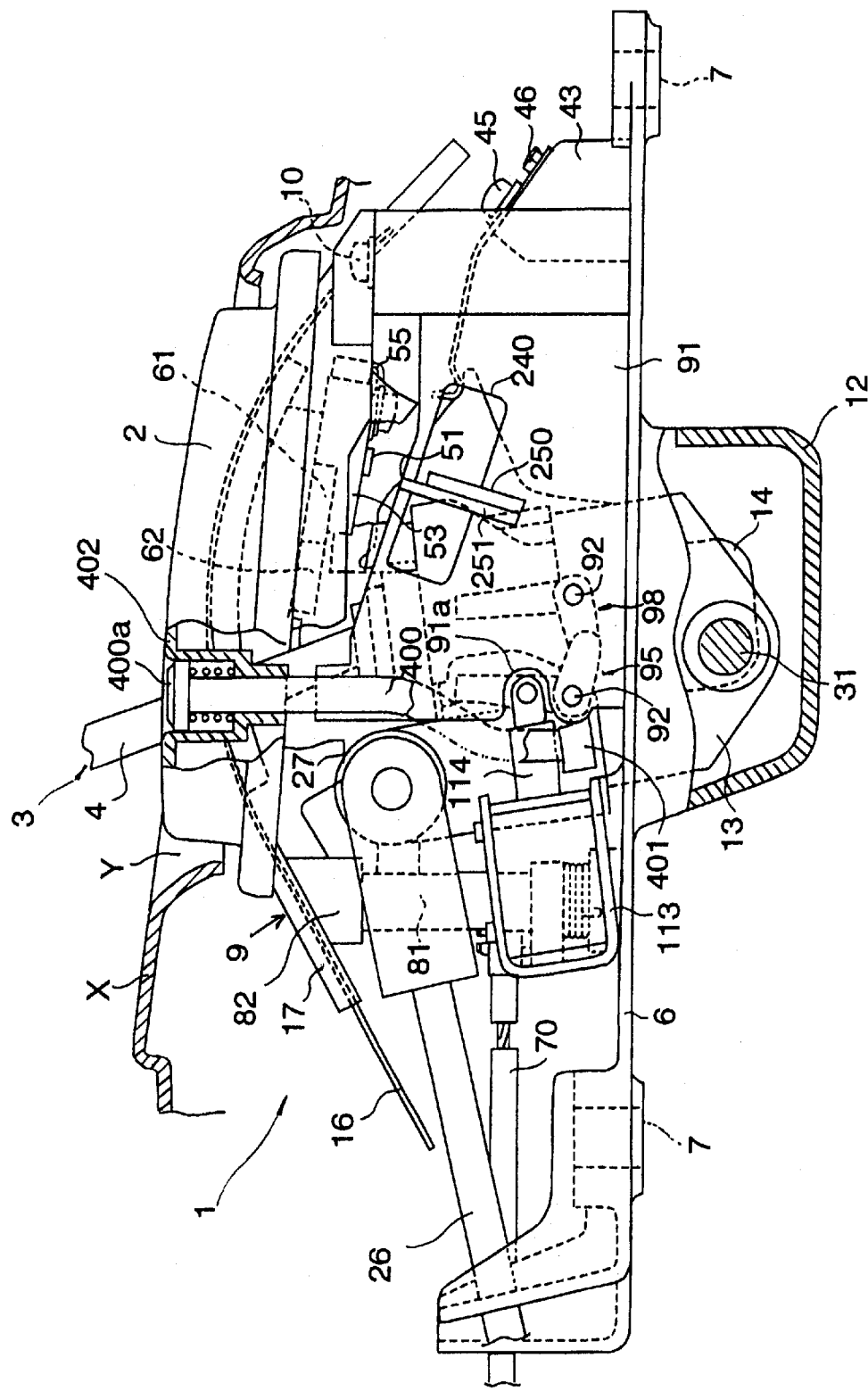
FIG. 3 is a schematic left side view of the automatic transmission shifting arrangement.
Figure 4:
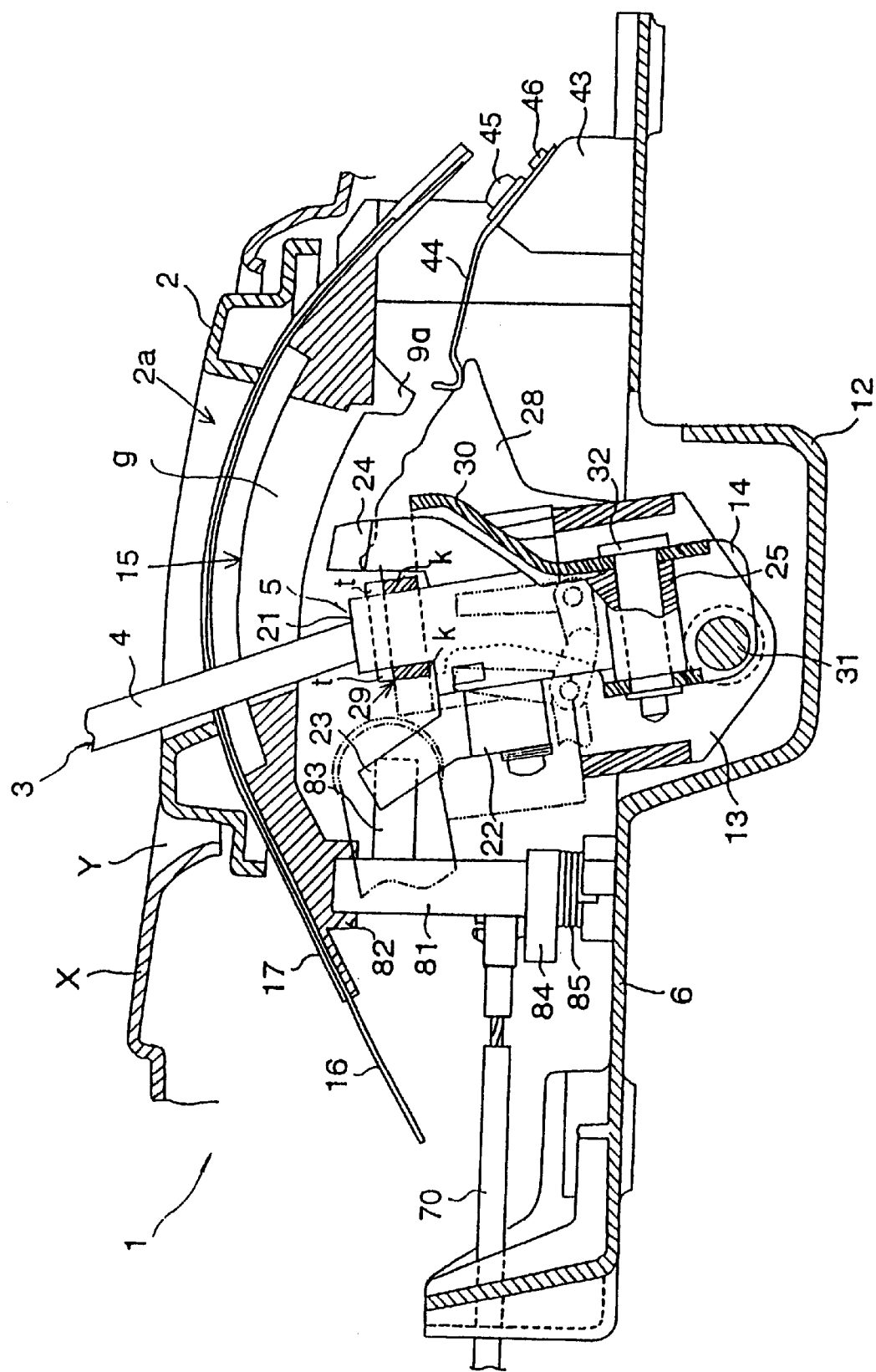
FIG. 4 is a cross-sectional view taken along line A—A in FIG. 2.

Referring to the drawings in detail, particularly to FIGS. 1 through 4 which show a shift arrangement 1 with a manual gear shift feature in accordance with an embodiment of the invention, the shift arrangement 1 is installed in a console X between separate seats (not shown) and has a cover panel 2 fitted into an opening Y of the console X. The cover panel 2 is formed with a shifting channel opening 2a extending in a generally lengthwise direction (which refers to the lengthwise direction of the vehicle from the front to the back) which is in conformity in shape with a shifting channel opening 15 (which will be described in detail later) formed in the upper panel 9. The shifting channel opening 2a has four automatic driving positions for positioning a shift or selector lever 3 to select available ranges, namely a parking (P) range, a reverse (R) range, a neutral (N) range and a drive (D) range. As shown in FIG. 4 in detail, the shift lever 3 comprises a lower plastic base member 5 (which will be described in detail later) made from a synthetic resin and an upper steel rod 4 inserted into and structurally integrated with the lower base member 5. The shift lever 3 is provided with a grip or knob 4a secured to the top of the upper steel rod 4. The cover panel 2 prevents dusts and liquids such as spilled drinks from entering as pollutants the interior mechanism of the shifting arrangement 1.

The shift arrangement 1 has a generally rectangularly-shaped base panel 6 and a generally square-shaped upper panel 9, both panels being installed under the cover panel 2. The base panel 6 at its corners is formed with four threaded bores 7 (see FIG. 3) and is secured to the vehicle body by means of fixing bolts 8 (see FIG. 2) to mount thereon a lower structure of the shift arrangement 1. The upper panel 9 at its corners is secured to support pillars 6a extending from the base plate 6 by means of three set screws 10 (see FIGS. 2 and 3) to which an upper structure of the shift arrangement 1 is installed. The upper panel 9 at its opposite sides is integrally formed with front and rear projections 11 which engage with counter hooks (not shown) of the cover panel 2 to retain the cover panel 2 so as to make the shifting channel opening 15 completely overlap the shifting channel opening 2a of the cover plate 2. The base panel 6 is provided with a box-shaped casing 12 extending downward therefrom. As will be described later, first and second swivel brackets 13 and 14 are partly received in the box-shaped casing 12 to which the shift lever 3 is pivotally mounted thereto to swivel in the lengthwise or first direction and the transverse or second direction. The upper panel 9 is formed with a generally zigzag-shaped shifting channel opening 15 in conformity exactly in shape with the shifting channel opening 2a to allow lengthwise and transverse swivel movement of the shift lever 3.

Figure 1:
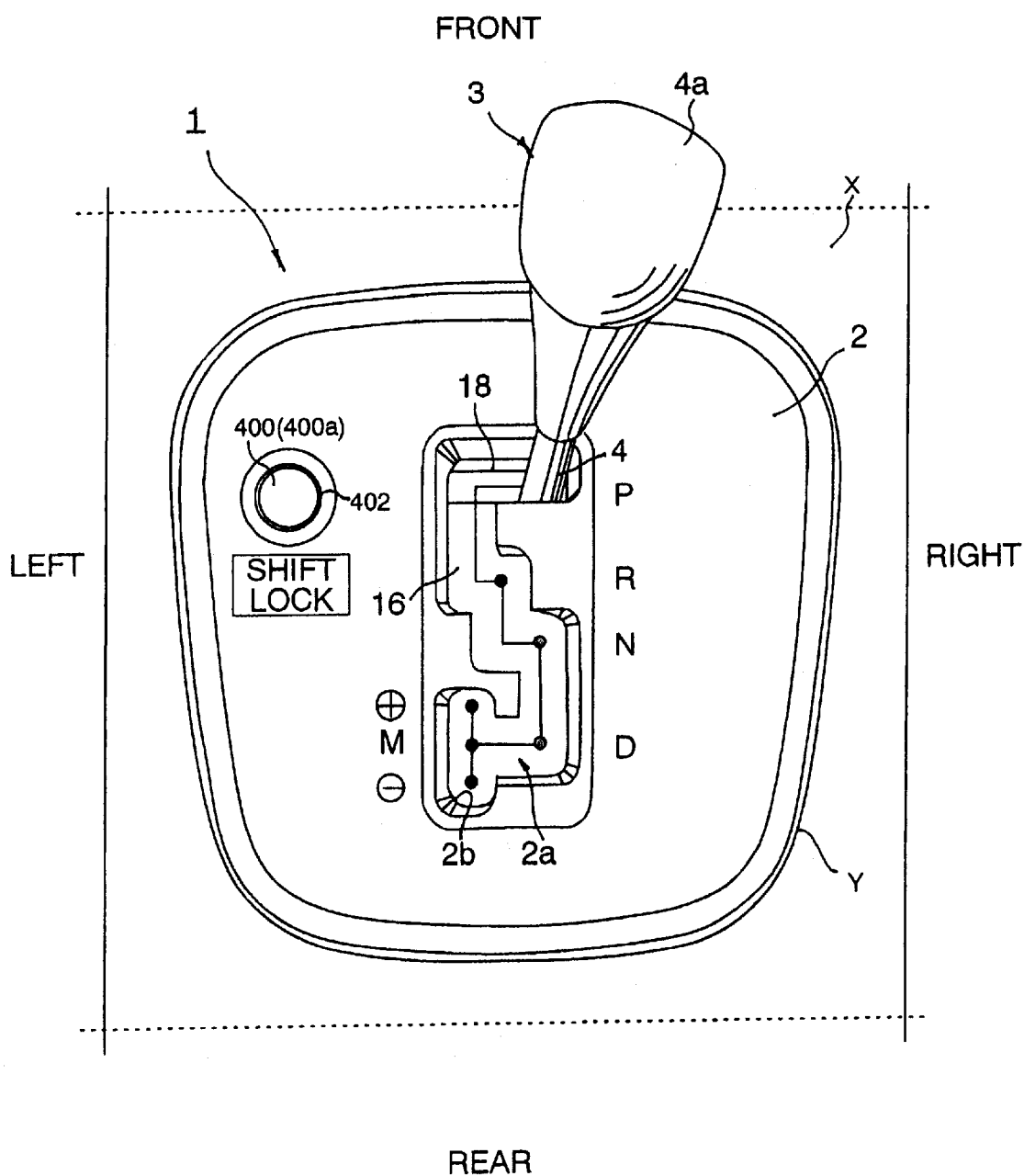
FIG. 1 is a view showing an outer appearance of a shifting arrangement of an automatic transmission with a manual gear shift feature for an automotive vehicle in accordance with an embodiment of the invention.

As shown in detail in FIG. 1, the shifting channel opening 15 of the upper panel 9 comprises a range shifting channel and a manual shifting channel. The range shifting channel includes slot sections G1 to G6, and the manual shifting channel includes slot channels G7 to G9. Specifically, a slot section G1 extends in the transverse or second direction to situate the upper steel rod 4, and hence the shift lever 3, in the P range selecting position at its extreme end. A slot section G2 extends backward from the transverse slot section G1 in the lengthwise or first direction to allow shifting swivel movement of the upper steel rod 4 of the shift lever 3 from the P range selecting position. A slot section G3 extends from the lengthwise slot section G2 in the transverse direction and has a length shorter than the transverse slot section G1 to situate the upper steel rod 4 of the shift lever 3 in the R range selecting position at its extreme end. A slot section G4 extends backward from the transverse slot section G3 in the lengthwise direction to allow shifting swivel movement of the upper steel rod 4 of the shift lever 3 from the R range selecting position. A slot section G5 extends from the lengthwise slot section G4 in the transverse direction and has an extreme end at a transverse position in which the extreme end of the transverse slot section G1 is to situate the upper steel rod 4 of the shift lever 3 in the N range selecting position at its extreme end. A slot section G6 extends backward from the transverse slot section G5 in the lengthwise direction to situate the upper steel rod 4 of the shift lever 3 in the D range or automatic gear shift selecting position at its extreme end. A slot section G7 extends from the lengthwise slot section G6 in the lengthwise direction but opposite to the transverse slot section G1 by the same length as the transverse slot section G1 to allow shifting swivel movement of the upper steel rod 4 of the shift lever 3 from the D range selecting position to a manual (M) range or manual gear shift selecting position. The extreme end of the transverse slot section G7 is in alignment with the lengthwise slot section G2 in the transverse direction. Accordingly, the R range selecting position is located between the P range selecting position and the M range selecting position. A slot section G8 extends forward from the transverse slot section G7 in the lengthwise direction and has a length shorter than the lengthwise slot section G6 to allow forward swivel movement of the upper steel rod 4 of the shift lever 3 for a step-by-step manual up-shift. A slot section G9 extends downward from the transverse slot section G7 of the shifting channel 15 in the lengthwise direction and has a length shorter than the lengthwise slot section G6 of the shifting channel 15 to allow backward swivel movement of the upper steel rod 4 of the shift lever 3 for a step-by-step manual down-shift. The shifting channel opening 2a of the cover plate 2 is formed to completely overlap the shifting channel 15 of the upper panel 9 and, however, to be analogously larger than the shifting channel opening 15 of the upper panel 9, so as to restrain the shift lever 3 in position with the respective slot sections of the shifting channel 15. As apparent in FIG. 1, the shift lever 3 situated in the P range selecting position can be swiveled backward to the D range selecting position via the R range selecting position and the N range selecting position in order. While the shift lever 3 is situated in the D range selecting position, the automatic transmission (not shown) equipped with the shift arrangement 1 achieves scheduled automatic shifts to forward gears according to driving conditions including vehicle speed and engine load or throttle opening. On the other hand, while the shift lever 3 is situated in the M range selecting position, the automatic transmission is allowed to be manually shifted up or down by step-by-step shifting. Specifically, when the shift lever 3 is swiveled upward in the transverse slot section G7 of the shifting channel 15.

The shift lever 3 is always urged in the transverse direction by a pre-loaded force so as to be situated in the respective range selecting positions P, R, N and D. Accordingly, in order to shift the automatic transmission from the P range selecting position into the R range selecting position, the shift lever 3 is swiveled along the transverse slot section G1 of the shifting channel 15 in the transverse direction against the pre-loaded force, and then swiveled backward along the transverse slot section G2 of the shifting channel 15 in the lengthwise direction. When the shift lever 3 reaches the extreme end of the lengthwise slot section G2 of the shifting channel 15, it is forced to swivel along the transverse slot section G3 of the shifting channel 15 to the R range selecting position. In order to make a step-by-step manual gear shift of the automatic transmission, the shift lever 3 is swiveled against the pre-loaded force along the transverse slot section G7 of the shifting channel 15 from the D range selecting position into the M range selecting position and further swiveled forward or backward along the slot section G8 or G9 of the shifting channel 15 while it remains swiveled in the transverse direction.

In the shift arrangement 1, the respective selecting positions P, R, N, D and M are arranged in four lengthwise different positions and three transverse different positions even though taking the lengthwise slot section G2 of the shifting channel 15 as one of transverse positions. That is, the P, N and D range selecting positions lie on a same lengthwise line which is different from lengthwise lines on one side, i.e. the left side in this embodiment, of the P range selecting position on which the R range selecting position and both lengthwise slot section G2 of the shifting channel 15 and M range selecting position lie respectively, and the D and M range selecting positions lie on a same transverse line which is different from transverse lines on which the P, R and N range selecting positions respectively lie. In other words, the P, N and D range selecting positions are located in a same transverse position which is different from transverse positions at which the R and M range selecting positions are respectively located, and the D and M range selecting positions are located at a same lengthwise position which is different from transverse positions on which the P, R and N range selecting positions are respectively located, so that the shift lever 3 takes only three transverse positions in order to select the five range selecting positions. As compared to a shift arrangement in which the M range selecting position is located on a side of the P, N and D range selecting positions opposite in the transverse direction to a side where the R range selective position is located, i.e. which has four transverse positions in the case that the lengthwise slot section G2 of the shifting channel 15 is considered as one of the transverse positions, the shift lever 3 needs only a shortened length of transverse swivel movement, which is always desirable for a comfortable feeling of compact swivel operation of the shift lever 3, in particular, of step-by-step manual gear shift operation in the M range selecting position. As shown in FIG. 4, a slide cover 16 is installed between the cover panel 2 and the upper panel 9 to cover the shifting channel openings 2a and 15 of the cover panel 2 and the upper panel 9. The slide cover 16 is formed with a transverse slot 18 (see FIG. 1) which receives the upper steel rod 4 of the shift lever 3 to allow transverse swivel movement of the shift lever 3 and is guided by means of lengthwise guide ways 17 integral with these cover panel 2 and upper panel 9 to move back and forth in the lengthwise direction following lengthwise swivel movement of the shift lever 3.

Figure 5:
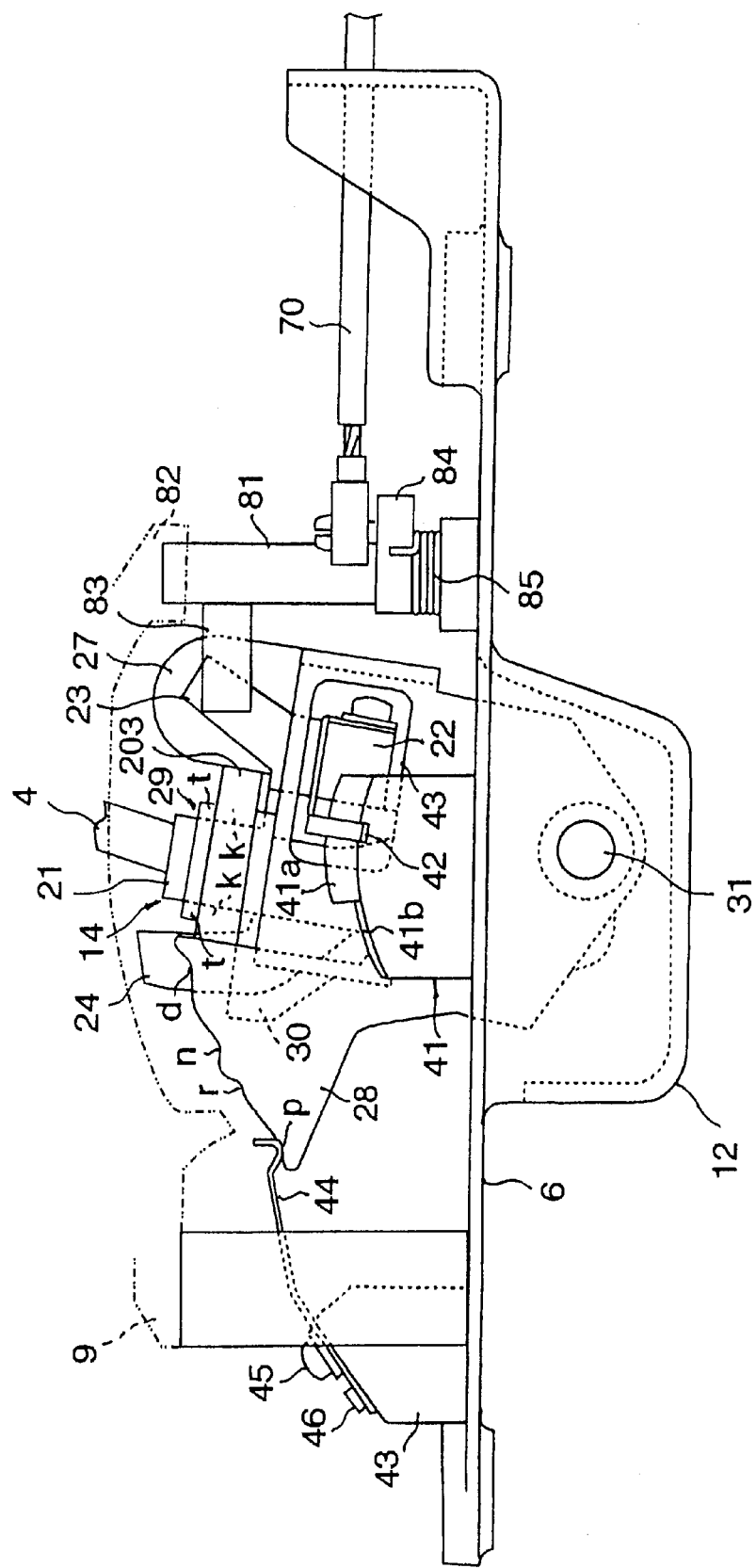
FIG. 5 is a schematic right side view of the automatic transmission shifting arrangement.
Figure 6:
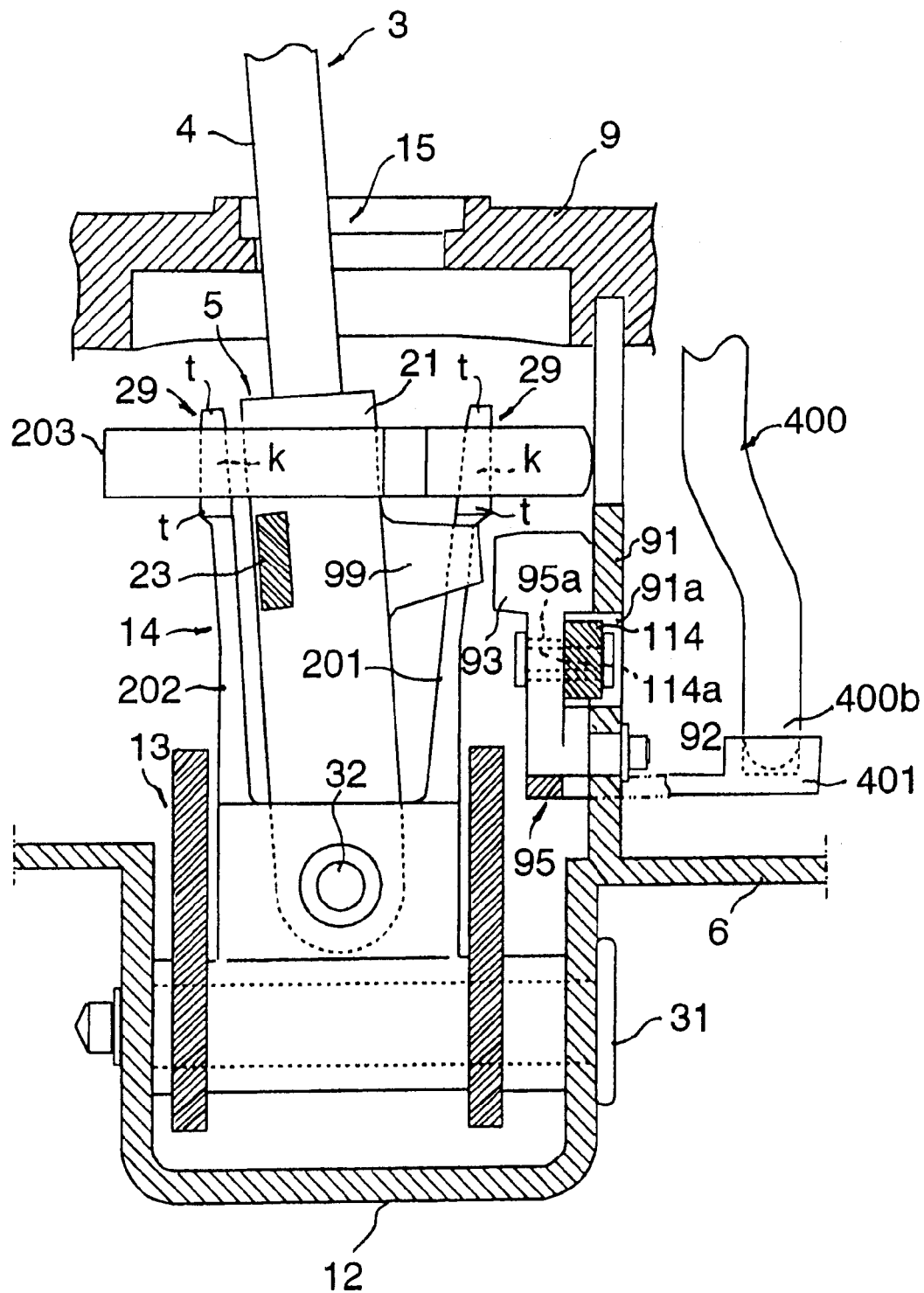
FIG. 6 is an enlarged schematic front view of part around a shift lever of the automatic transmission shifting arrangement.
Figure 7:
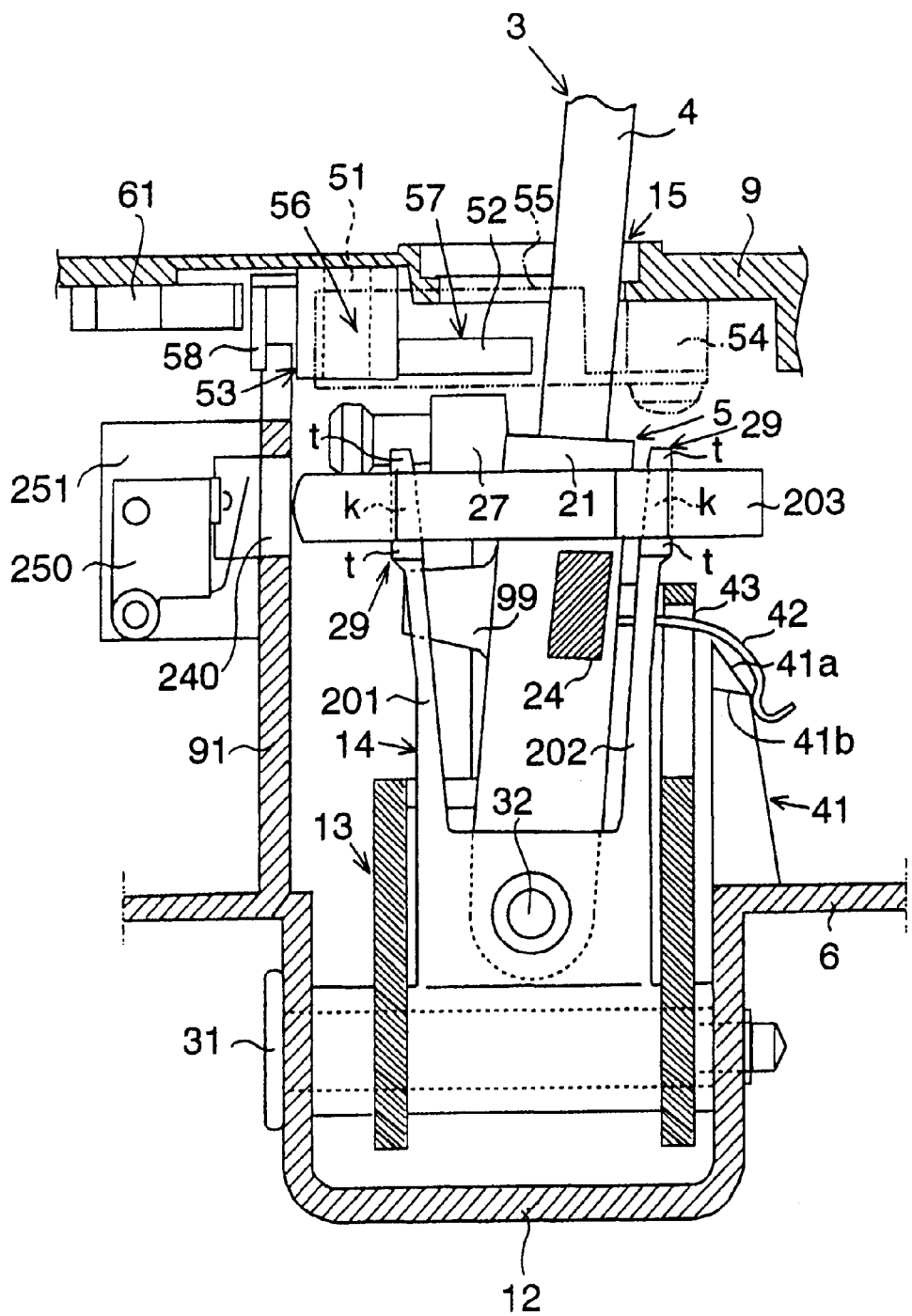
FIG. 7 is an enlarged schematic rear view of the part around the shift lever of the automatic transmission shifting arrangement.
Figure 8:
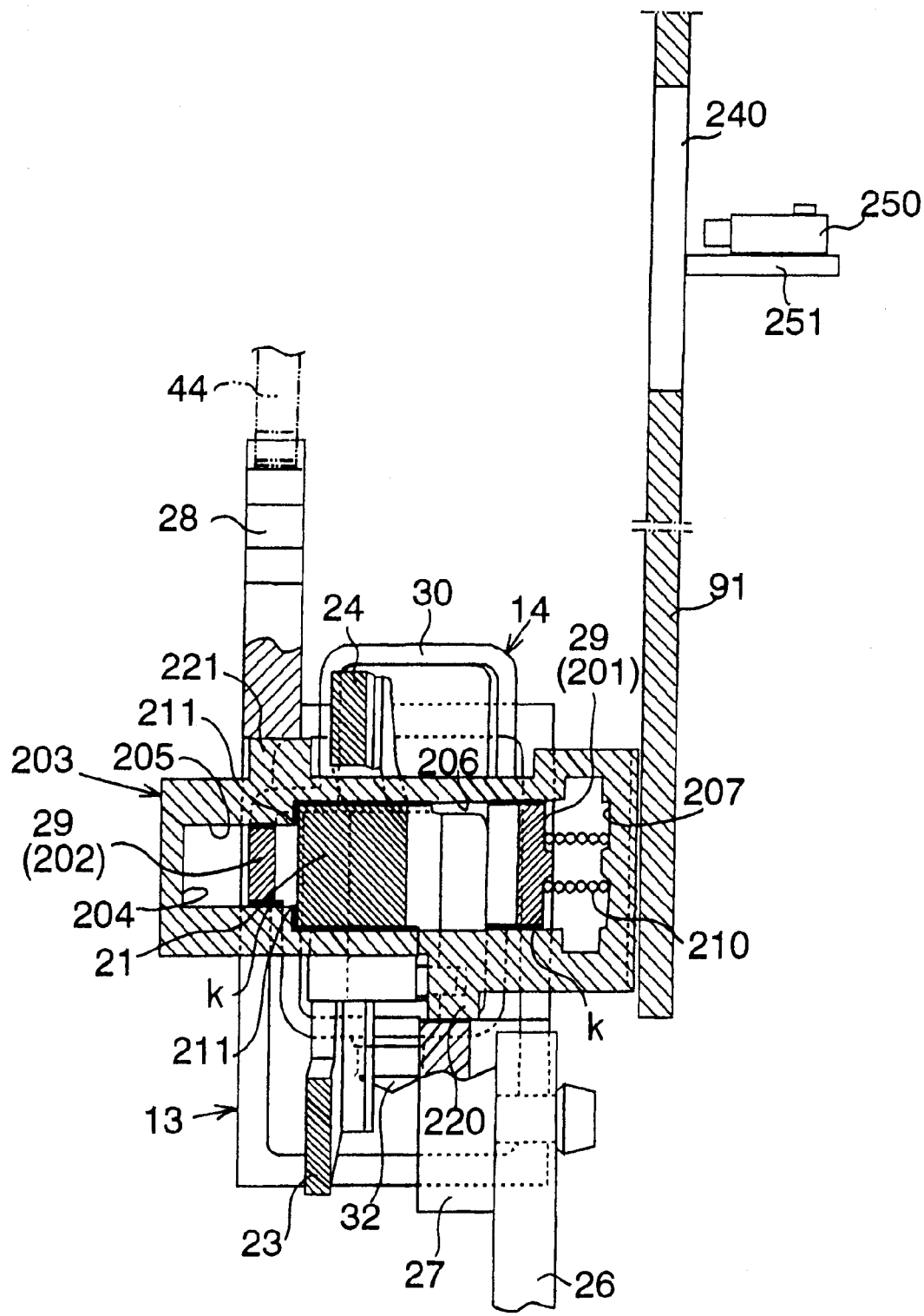
FIG. 8 is an enlarged schematic plan view of the part around the shift lever of the automatic transmission shifting arrangement.

Referring to FIGS. 5 through 8 showing the interior mechanism installed under the cover panel 2, the shift lever 3 is pivotally mounted to the base panel 6 by means of the first and second swivel brackets 13 and 14 as was previously described. The lower base member 5 of the shift lever 3 comprises a square pillar 21 into which the upper steel rod 4 is inserted, a front block 22 secured to the front wall of the square pillar 21, a front plate 23 extending toward the upper front from the front block 22, and a rear buffer arm 24 extending from and off to the upper back the rear wall of the square pillar 21. The square pillar 21 at its lower end is provided with a cylindrical hollow boss 25 extending in the lengthwise direction (see FIG. 4). The first swivel bracket 13 has four walls, namely front, rear, front and back walls. Similarly, the second swivel bracket 14 has four walls, namely front, rear, front and back walls, and is configured smaller than the first swivel bracket 13. The first swivel bracket 13 has a front left upper extension 27 to which a shifting cable 26 (see FIG. 8) is secured as seen in FIGS. 3, 5 and 8 and a rear right extension 28 shaped like a sector and formed with a plurality of notched gate (p, r, n and d) as seen in FIGS. 4, 5 and 8. The second swivel bracket 14 at its transverse sides is provided with generally T-shaped detent gates 29 with grooves and detents. The second swivel bracket 14 at its back is swollen backward so as to prevent the shift lever 3 from interference with the rear buffer arm 24.

Referring back to FIGS. 3 and 4, a first shaft 31 extends in the transverse direction in the box-shaped casing 12 extending downward from the base panel 6 and is supported by the side walls of the box-shaped casing 12. The first swivel bracket 13 and the second swivel bracket 14 received in the inside of the first swivel bracket 13 are pivotally mounted on the first shaft 31 for lengthwise swivel movement about the first shaft 31. A second shaft 32 extends through the cylindrical hollow boss 25 in a direction perpendicular to the first shaft 31 and is supported by front and rear walls of the second swivel bracket 14. The square pillar 21 of the lower base member 5 of the shift lever 3 is received in the inside of the second swivel bracket 14 and is pivotally mounted on the second shaft 32 for transverse swivel movement about the second shaft 32. With the structure, the first and second swivel brackets 13 and 14 are allowed to swivel relatively to the base panel 6 and relatively to each other in the lengthwise direction only about the first shaft 31. The shift lever 3 is allowed to swivel with respect to both first and second swivel brackets 13 and 14 in the transverse direction about the second shaft 32 and to swivel together with the second swivel bracket 13 in the lengthwise direction about the first shaft 31. When the shift lever 3 is swiveled in the lengthwise direction, the second swivel bracket 14 is swiveled in the same direction about the first shaft 31 following the lengthwise swivel movement of the shift lever 3. On the other hand, when the shift lever 3 is swiveled in the transverse direction, the first and second swivel brackets 14 remain stationary.

The shift arrangement 1 includes various mechanisms such as a shift lever biasing mechanism, a shift lever click stopping mechanism, a shift lever neutralizing and manual shift switch actuating mechanism, and a key interlocking mechanism which incorporates a cable dragging mechanism, a shift locking mechanism, a shifting cable disconnecting mechanism, an M range switch actuating mechanism and a shock receiving mechanism, all of which are installed between the base plate 6 and the upper panel 9.

As shown in FIG. 5 and 7, the shift lever biasing mechanism comprises a wall member 41 extending upward from the base panel 6 and in the lengthwise direction on one side (right side) of the shift lever 3, and a first leaf spring detent member 42 bolted to the front block 22 of the lower base member 5 of the shift lever 3. The wall member 41 at one of its opposite sides adjacent the shift lever 3 has a flat upright surface even with the inner surface of the box-shaped casing 12. The wall member 41 at another of its opposite sides remote from the shift lever 3 has a curved surface section 41a gradually increasing a distance from the inner flat surface. The first leaf spring detent member 42 extends from the front block 22 of the lower base member 5 of the shift lever 3 to the front half curved surface section 41a of the wall member 41 passing through an opening 13a formed in the right side wall of the first swivel bracket 13 and is engaged by the front half curved surface section 41a of the wall member 41. When the first leaf spring detent member 42 of the shift lever 3 is moved left apart from the wall member 41 following swivel transverse movement of the shift lever 3, the first leaf spring detent member 42 of the shift lever 3 is bent up by the front half curved surface section 41a of the wall member 41 charging a restoring moment therein. The shift lever 3 is always urged to the right by means of the engagement between the first leaf spring detent member 42 of the shift lever 3 and the wall member 41. The curved surface section 41a is formed over the front half section of the wall member 41 so that the curved surface 41a is engaged by the first leaf spring detent member 42 of the shift lever 3 while the shift lever 3 is situated between the P and N range selecting positions. With the shift lever biasing mechanism, the shift lever 3 is stably held in the P range selecting position while situated in the P range selecting position which is the right-most position. When changing the transmission to the R range selecting position from the P range selecting position, it is necessary to swivel the shift lever 3 left along the transverse slot section G1 of the shifting channel 15 against the restoring moment of the first leaf spring detent member 42 of the shift lever 3 and then to swivel rearward along the lengthwise slot section G2 of the shifting channel 15 with the restoring moment of the first leaf spring detent member 42 of the shift lever 3 imparted thereon. The shift lever 3 swiveled to the end of the lengthwise slot section G2 of the shifting channel 15 is swiveled back to the R range selecting position along the transverse slot section G3 of the shifting channel 15 under the restoring moment of the first leaf spring detent member 42 of the shift lever 3. In the R range selecting position, the restoring moment of the shift lever 3 is still partly exerted on the shift lever 3. When changing the transmission to the N range selecting position from the R range selecting position, it is necessary only to swivel the shift lever 3 rearward along the lengthwise slot section G4 of the shifting channel 15 with the restoring moment of the first leaf spring detent member 42 of the shift lever 3 partly imparted thereon. The shift lever 3 swiveled to the end of the lengthwise slot section G4 of the shifting channel 15 is swiveled further back to the N range selecting position along the transverse slot section G5 of the shifting channel 15 under the restoring moment of the first leaf spring detent member 42 of the shift lever 3. When changing the transmission to the D range selecting position from the N range selecting position, the shift lever 3 needs to be swiveled rearward to the D range selecting position along the lengthwise slot section G6 of the shifting channel 15 with the restoring moment of the first leaf spring detent member 42 of the shift lever 3 partly imparted thereon. In the D range selecting position, the first leaf spring detent member 42 of the shift lever 3 has been disengaged from the front half curved surface section 41a of the wall member 41.

Referring to FIGS. 4, 5 and 8, the shift lever click stopping mechanism comprises the sector-shaped extension 28 and a second leaf spring detent member 44 secured to and extending forward from a support pillar 43 extending from the base panel 6. The sector-shaped extension 28 has a periphery defined by a circular arcuate having a center on the center axis of the first shaft 31 and is formed with notched gate (p, r, n and d) allocated to the P, R, N and D/M range selecting positions, respectively. The second leaf spring detent member 44 is secured to the support pillar 43 by a bolt 45 and prevented from turning about the bolt 45 by a retainer pin 46. The top end of the second leaf spring detent member 44 is brought into engagement with the notched gate (p, r, n and d), which effects the desired reliable holding of the shift lever 3 in the respective range selecting positions and provides a click stop feeling in the respective range selecting positions when the shift lever 3 is swiveled in the lengthwise direction. Further, as shown in FIGS. 5 and 7, the wall member 41 has a rear half section 41b whose surface is curved differently and discontinuously from the front half curved surface section 41a and is situated below the front half curved surface section 41a. The first leaf spring detent member 42 of the shift lever 3 is brought into engagement with the rear half curved surface section 41b when the shift lever 3 is swiveled to the D range selecting position along the lengthwise slot section G6 of the shifting channel 15 and gets over an intermediate ridge of the curved surface section 41b against the restoring moment thereof when the shift lever 3 is swiveled to the M range selecting position from the D range selecting position along the transverse slot section G7 of the shifting channel 15 with an effect of providing a click stop feeling in each of the D and M range selecting positions. Since, during the swivel movement of the shift lever 3 for selecting the D and M range selecting positions, the swivel movement of the shift lever 3 is not accompanied by any swivel movement of the first swivel bracket 13, the second leaf spring detent member 44 remains engaged with the notched gate (d) of the sector-shaped extension 28 allocated to the D/M range selecting position.

As described above, the engagement between the second leaf spring detent member 44 and the notched gates (p, r, n, d) of sector-shaped extension 28 provides the shift lever 3 with proper resistance during swivel movement for a range selection and provides a click stop feeling in the P, R, N and D range selecting positions. Further, the engagement between the first leaf spring detent member 42 and the rear half curved surface section 41b of the wall member 41 provides a click stop feeling in the D and M range selecting positions.

The following description is directed to the shift lever neutralizing and manual shift switch actuating mechanism for holding the shift lever 3 in the holding position, i.e. in the M range selecting position, and actuating up- and down-shift switches by means of the shift lever 3.

As shown in FIGS. 2, 3 and 7, the upper panel 9 is provided with an upright shaft 51 secured to the under side thereof and positioned on one side, i.e. the right side, of the M range selecting position. A cam 53 having a pair of front and rear arms 52 and 52 extending within the lengthwise slot section G8 and G9 of the shifting channel 15, respectively, is mounted for rotation on the upright shaft 51. The upper panel 9 is further provided with an upright support 54 secured to the under side thereof and positioned on another side, i.e. the left side, of the M range selecting position. A third leaf spring detent member 55 is attached to the upright support 54 and extends toward the upright shaft 51 to engage a notched gate 56 formed in the cam 53. In this state, a semi-circular gate 57 formed between the front and rear arms 52 of the cam 53 accords with the holding position which is occupied by the shift lever 3 swiveled in the transverse direction to the M range selecting position from the D range selecting position. On the other hand, the cam 53 at its front end is provided with an upright actuator pin 58 secured to the under side thereof. The upper panel 9 is provided with upshift and downshift switches 61 and 62 which are situated on opposite side of the actuator pin 58 so as to be selectively engaged by the actuator pin 58.

When the shift lever 3 is transversely swiveled along the transverse slot section G7 of the shifting channel 15 to select the M range, the upper steel rod 4 of the shift lever 3 enters the semi-circular gate 57 of the cam 53, the cam 53 is brought into engagement with the third leaf spring detent member 55 to hold the shift lever 3 in the M range selecting position, i.e. the holding position. When swiveling the shift lever 3 along the lengthwise slot section G8 of the shifting channel 15 in the lengthwise direction against the third leaf spring detent member 55 from the holding position, the cam 53 turns in the counterclockwise direction as seen in FIG. 2 to actuate the shiftup switch 61 by means of the actuator pin 58. On the other hand, when swiveling the shift lever 3 along the lengthwise slot section G9 of the shifting channel 15 in the lengthwise direction against the third leaf spring detent member 55 from the holding position, the cam 53 turns in the clockwise direction as seen in FIG. 2 to actuate the shiftdown switch 62 by means of the actuator pin 58. Since these cam 53 and shift switches 61 and 62 attached to the upper panel 9 are situated far from the center of swivel movement of the shift lever 3, the shift lever 3 can make a long distance swivel movement in the lengthwise direction before it brings the actuator pin 58 into engagement with the switch 61, 62. This manual shifting mechanism guarantees a manual gear shift at an almost fixed timing in spite of somewhat irregular movement of the shift lever 3 even if there is a positional error in attaching the shift switches 61 and 62 relative to the cam 53 or the actuator pin 58. Further, the manual shifting mechanism in which the shift switch 61, 62 is actuated not directly by the shift lever 3 but through the cam 53 provides an increase in the degree of layout freedom of the shift switches 61 and 62. For example, the shift switches 61 and 62 can be situated in position far from the shifting channel opening 15 so as to avoid interference with it.

When the shift lever 3 is swiveled to the M range selecting position from the D range selecting position, the shift lever 3 enters the semi-circular gate 57 of the cam 53 engaged by the third leaf spring detent member 55. The engagement between the third leaf spring detent member 55 and the notched gate 56 of the cam 53 holds the shift lever 3 neutral and provides it with proper resistance during lengthwise swivel movement for a manual gear shift. In addition, the engagement between the second leaf spring detent member 44 and the notched gate (d) of sector-shaped extension 28 provides the shift lever 3 with proper resistance during lengthwise swivel movement for a manual gear shift.

Figure 9:
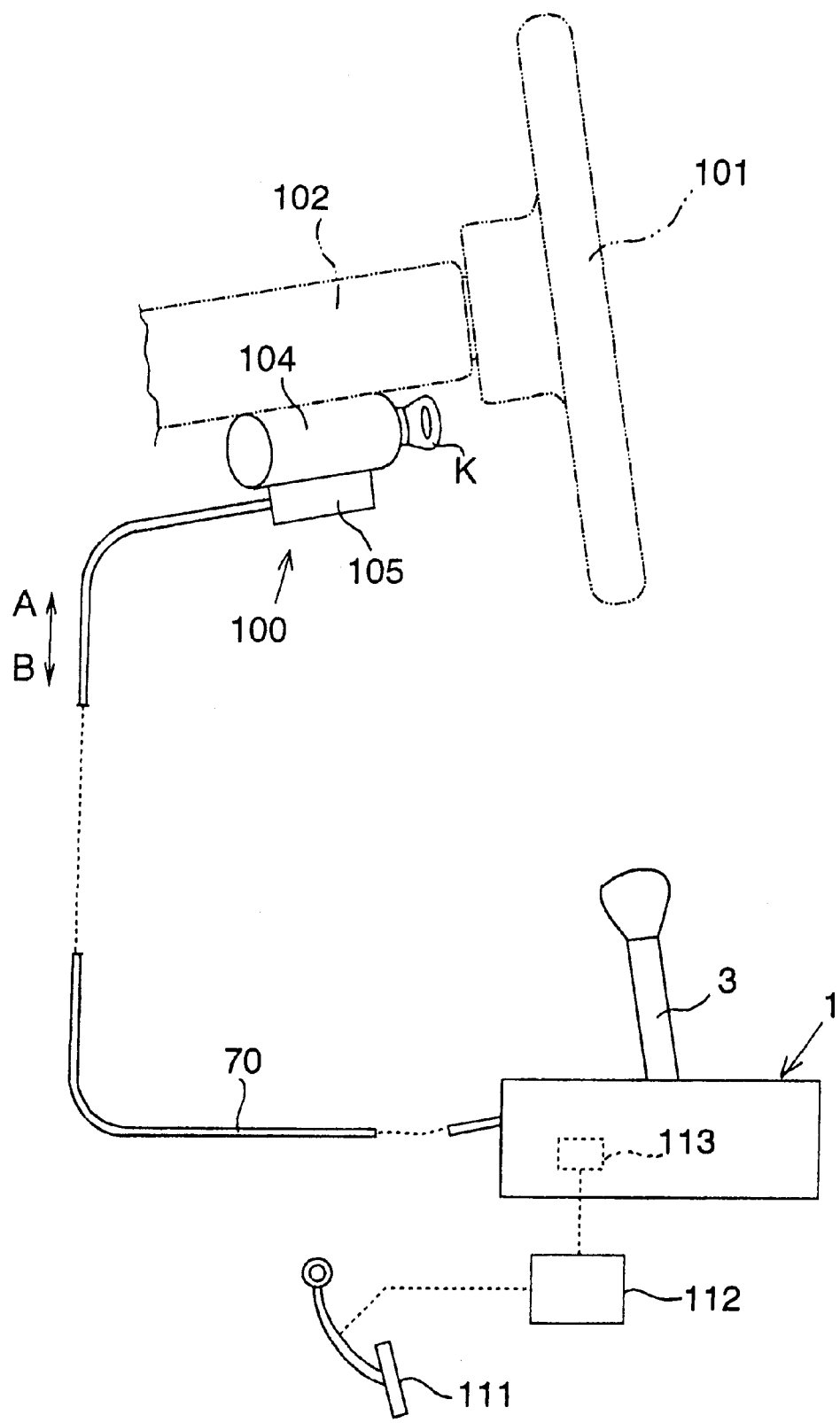
FIG. 9 is an explanatory view showing a key interlocking mechanism and a shift locking mechanism of the automatic transmission shifting arrangement.
Figure 10:
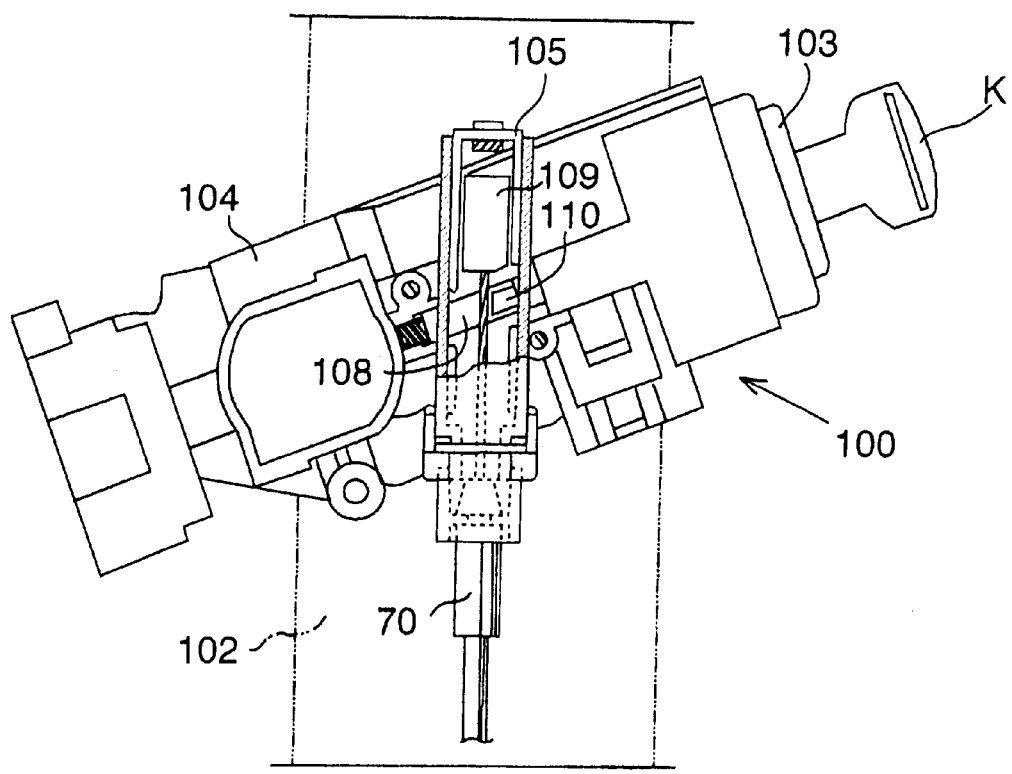
FIG. 10 is an explanatory view showing a mechanical structure of the key interlocking mechanism.
Figure 11:
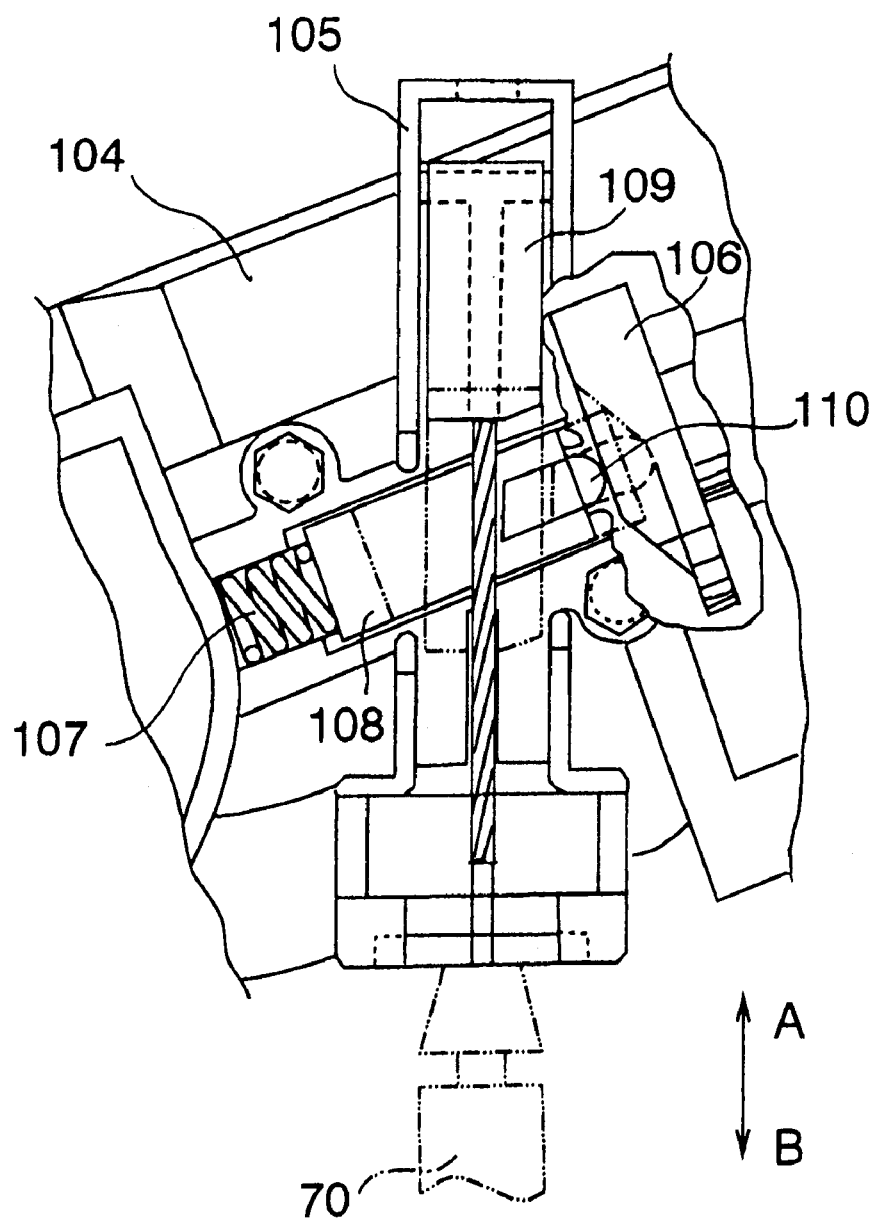
FIG. 11 is an enlarged side view of the key interlocking mechanism.

FIGS. 9 to 11 shows the key interlocking mechanism structurally combined with the shift locking mechanism. As shown in FIG. 9, the shifting arrangement 1 is linked with a starter key arrangement 100 by means of a locking cable 70. The starter key arrangement 100, which is installed to a steering column 102 of a steering wheel 101, includes a key cylinder 103 (see FIG. 10) housed in a key cylinder casing 104 secured to the steering column 102 and a cable connector casing 105. The key cylinder 103 has for positions, namely a LOCK position, an Acc position (accessory actuation position), an ON position (electric instruments powering position), and a START position (engine start), which are selected by an ignition key K. The locking cable 70 is driven or dragged in a direction shown by an arrow A when the shift lever 3 is swiveled in the lengthwise direction toward the P range selecting position and in a direction shown by an arrow B when the shift lever 3 is swiveled in the lengthwise direction from the P range selecting position. While the shift lever 3 is in the P range selecting position, the locking cable 70 causes the key cylinder 103 to permit the ignition key K to turn to the LOCK position in which the ignition key K is pulled out. On the other hand, while the shift lever 3 is out of the P range selecting position, the locking cable 70 causes the key cylinder 103 to prevent the ignition key K from turning to the LOCK position.

As shown in FIGS. 10 and 11 in detail, the key cylinder casing 104 has a cam disk 106 which is turned by the ignition key K and a slider block 108 with a projection 110 urged against cam surface of the cam disk 106 by a spring 107. The locking cable 70 at one of its ends is connected to a cable connector block 109 which is housed in the cable connector casing 105 to slide. The cam disk 106 is turned to a position shown by solid line in FIG. 11 following a turn of the ignition key K to the LOCK position, forcing the slider block 108 against the spring 107 to a position in which the projection 110 of the slider block 108 is engageable with the cable connector block 109. On the other hand, the cam disk 106 is turned to a position shown by dotted broken line in FIG. 11 following a turn of the ignition key K to any position other than the LOCK position, allowing the slider block 108 to return to a position in which the projection 110 of the slider block 108 does not engage with the cable connector block 109. While the shift lever 3 is out of the P range selecting position, the locking cable 70 situates the cable connector block 109 in a position shown by dotted broken line in FIG. 11 in which the cable connector block 109 prevents the slider block 108 from sliding down by engagement with the projection 110 of the slider block 108.

With the key interlocking mechanism, until the shift lever 3 is situated in the P range selecting position, the ignition key K can not be pulled out. On the other hand, as long as the ignition key K remains put in the key cylinder 103, the shift lever 3 can not be moved to any range selecting position from the P range selecting position.

Figure 12:
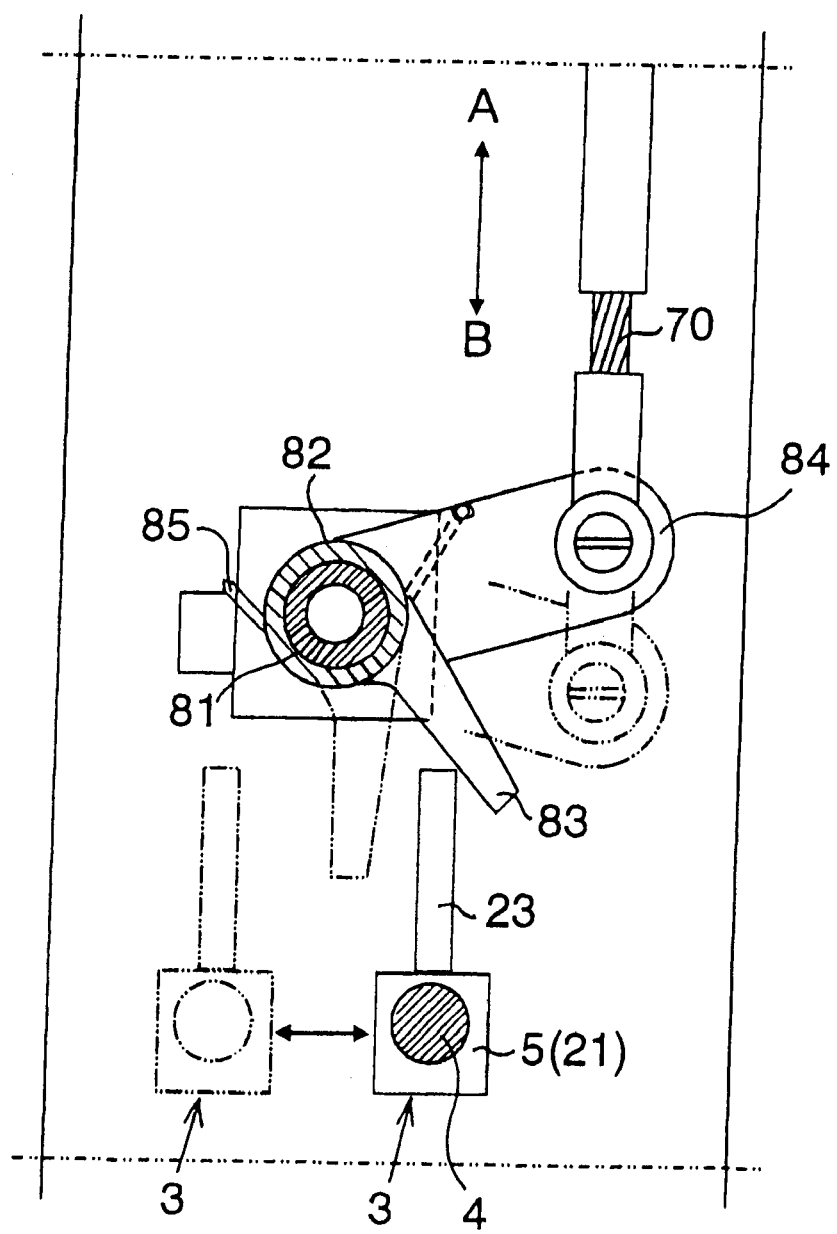
FIG. 12 is an explanatory view showing operation of a cable dragging mechanism in the key interlocking mechanism.

The key interlocking mechanism incorporates a cable dragging mechanism as shown in FIGS. 2 through 5. The cable dragging mechanism includes an upright support 81 standing in front of the shift lever 3 and upper and lower integral arms 83 and 84 separated by a specified vertical distance and a specified angle from each other. The upright support 81 is supported for rotation by and between a boss (not shown) extending upward from the base panel 6 and a boss 82 extending downward from the upper panel 9. The upper arm 83 extends toward the shift lever 3 to cooperate with the front plate 23 of the shift lever 3. The lower arm 84 is connected to another end of the locking cable 70. A coiled return spring 85 is mounted on the upright support 81 and engaged at opposite ends by the lower arm 84 and the base panel 6, respectively, to always force the upright support in the clockwise direction as seen in FIG. 12 so as thereby to direct the upper arm 83 behind the upright support 81 in the lengthwise direction as shown by dotted broken line in FIG. 12. When the shift lever 3 is swiveled along the transverse slot section G1 of the shifting channel 15 to select the P range selecting position (shown by solid line in FIG. 12) from any other range selecting position, the shift lever 3 at the front plate 23 forces the upper arm 83, and hence the upright support 81, in the counterclockwise direction against the return spring 85 to push the locking cable 70 in the direction A. As a result, the cam disk 106 is allowed to turn to the LOCK position in which the ignition key K is removable. On the other hand, when the shift lever 3 is swiveled along the transverse slot section G1 of the shifting channel 15 from the P range selecting position in order to select any other ranges, the transverse swivel movement of the shift lever 3 is accompanied by a turn of the upper arm 83, and hence the upright support 81, in the clockwise direction caused by the return spring 85 to drag the locking cable 70 in the direction B. As a result, the cam disk 106 is prevented by the cable connector block 109 from turning to the LOCK position from any other position, so as thereby to prevent the ignition key K from pulled out of the key cylinder 103.

In this key interlocking mechanism, since the arms 83 and 84 are separated by a specified vertical distance and a specified angle from each other, the locking cable 70 is laid between the cable dragging mechanism and the starter key arrangement 100 without interfering associated parts including the upper panel 9 and the slide cover 16. Further, since the upper arm 83 is situated far from the center of swivel movement of he shift lever 3 and closely to the upper panel 9, the shift lever 3 can make a long distance swivel movement in the transverse direction for dragging the locking cable 70. This cable dragging mechanism guarantees a specified distance of movement of the locking cable in the opposite directions A and B even if there is a positional error in attaching the upright support 81 and the integral upper and lower arms 83 and 84, which is always desirable for reliable operation of the key interlocking mechanism. Further, the upright support 81 supported between the base panel 6 and the upper panel 9 is provided with improved structural rigidity.

Figure 13:
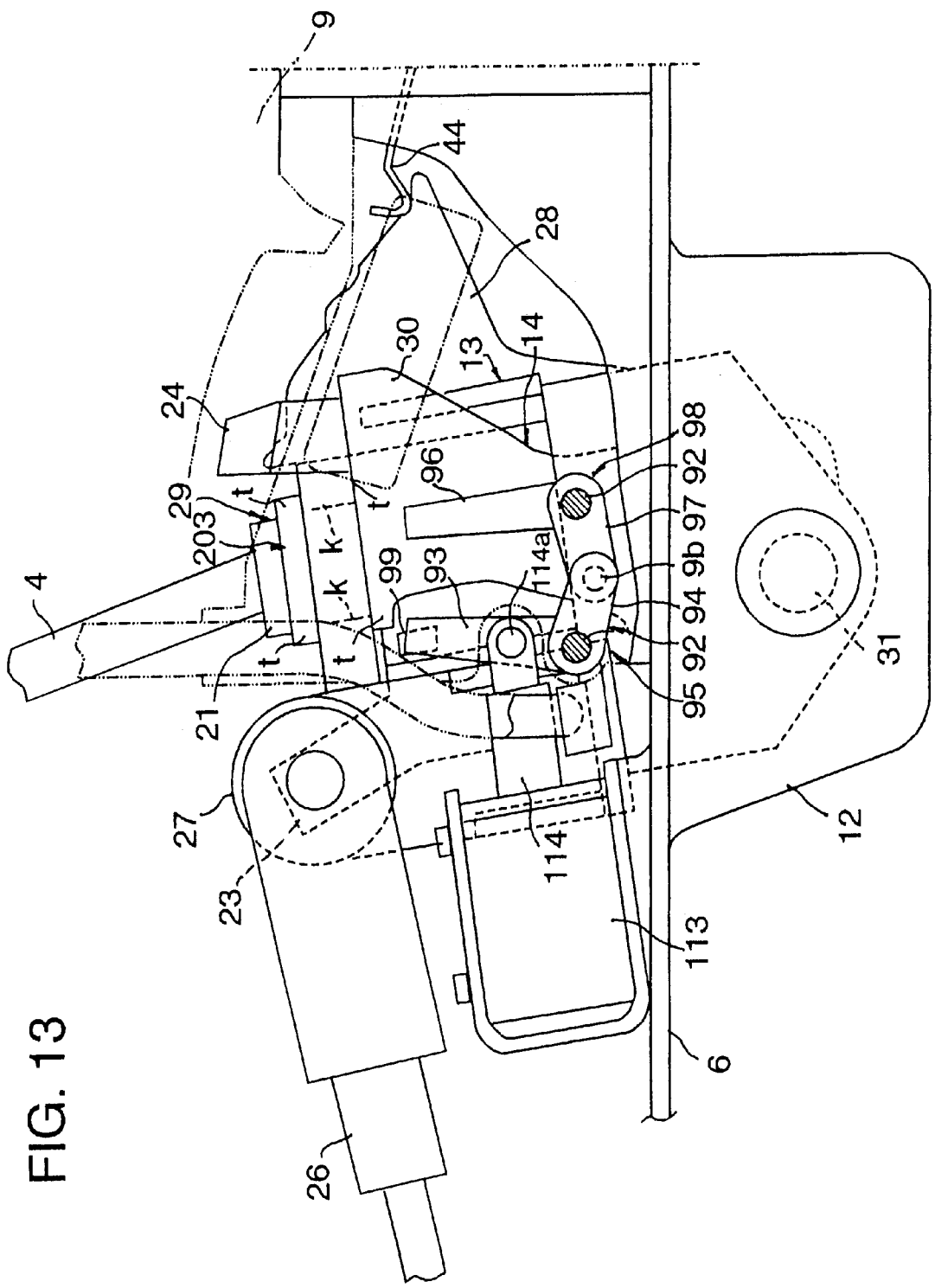
FIGS. 13 and 14 are explanatory views showing a structure and operation of the shift locking mechanism which is in a parking (P) range.

In addition to that, while the ignition key K is in the LOCK position, the locking cable 70 is prevented from being dragged in the direction B, so as thereby to prevent the shift lever 3 from swiveling in the lengthwise direction, the key interlocking mechanism prevents transverse swivel movement of the shift lever 3 from the P range selecting position unless a brake pedal is stepped on. Specifically, as shown in FIG. 13, the shift locking mechanism incorporates a brake apply sensor unit 112 operative to monitor whether a foot brake pedal 111 is stepped on or not and an electromagnetic solenoid 113 disposed on the base panel 6 which is energized with a signal which is provided by the brake apply sensor unit 112 while the foot brake pedal 111 is stepped on. The electromagnetic solenoid 113 mechanically prevents the shift lever 3 from swiveling along the transverse slot section GI of the shifting channel 15 from the P range selecting position unless it is energized.

Specifically, as shown in FIGS. 3, 6 and 13, the shift locking mechanism cooperative with the foot brake pedal 111 includes an upright side restraint wall 91 disposed on one side, i.e. the left side in this embodiment, of the shift lever 3, and a pair of horizontal pivot shafts 92 extending from the side restraint wall 91 and separated at a specific distance in the lengthwise direction from each other. A front crank lever (P range shift locking lever) 95 having an approximately vertical arm 93 and an approximately horizontal arm 94 is pivotally mounted on the front pivot shaft 92. A rear crank lever (N range shift locking lever) 98 having an approximately vertical arm 96 and an approximately horizontal arm 97 is pivotally mounted on the rear pivot shaft 92. The front and rear crank levers 95 and 98 are linked with each other by means of a linkage between a link pin 90 secured to either one of the horizontal arms 94 and 97 and a slot (not shown) formed in the other of the horizontal arms 94 and 97 so as to turn relatively to each other. A plunger 114 of the electromagnetic solenoid 113 is linked to the mid portion of the vertical arm 93 of the front crank lever 95 by means of a link pin 114a secured to the plunger 114 and a slot 95a formed in the vertical arm 95 (see FIG. 6). When the electromagnetic solenoid 113 is energized to protrude the plunger 114, forcing the front crank lever 95 to turn in the clockwise direction (seen in FIGS. 3 and 9) about the front pivot shaft 92. The clockwise turn of the front crank lever 95 is accompanied by a counterclockwise turn of the rear crank lever 97 about the rear pivot shaft 92 through the linkage between the horizontal arms 94 and 97. On the other hand, when the electromagnetic solenoid 113 is deenergized to retract the plunger 114, pulling back the front crank lever 95 in the counterclockwise direction (seen in FIGS. 3 and 9). The counterclockwise turn of the front crank lever 95 is accompanied by a clockwise turn of the rear crank lever 97 about the rear pivot shaft 92 through the linkage between the horizontal arms 94 and 97. As shown in FIG. 6, the plunger 114 and the vertical arm 93 of the front crank lever 95 are arranged side by side in the transverse direction, which make the shift locking mechanism bulky in the transverse direction. As shown in FIGS. 3 and 6, the side restraint wall 91 is formed with a semi-circular gate 91a at its front edge above the front pivot shaft 92 to receive the end of the link pin 114a and the end of the plunger 114 therein. This structure is effective to reduce the overall transverse size of the shifting arrangement 1 without causing interference between the shift locking mechanism and the side restraint wall 91. The linkage between the plunger 114 and the front crank lever 95 through the link pin 114 and the slot 95a causes smooth conversion of the linear movement of the plunger 114 into the swivel movement of the front crank lever 95.

Figure 14:
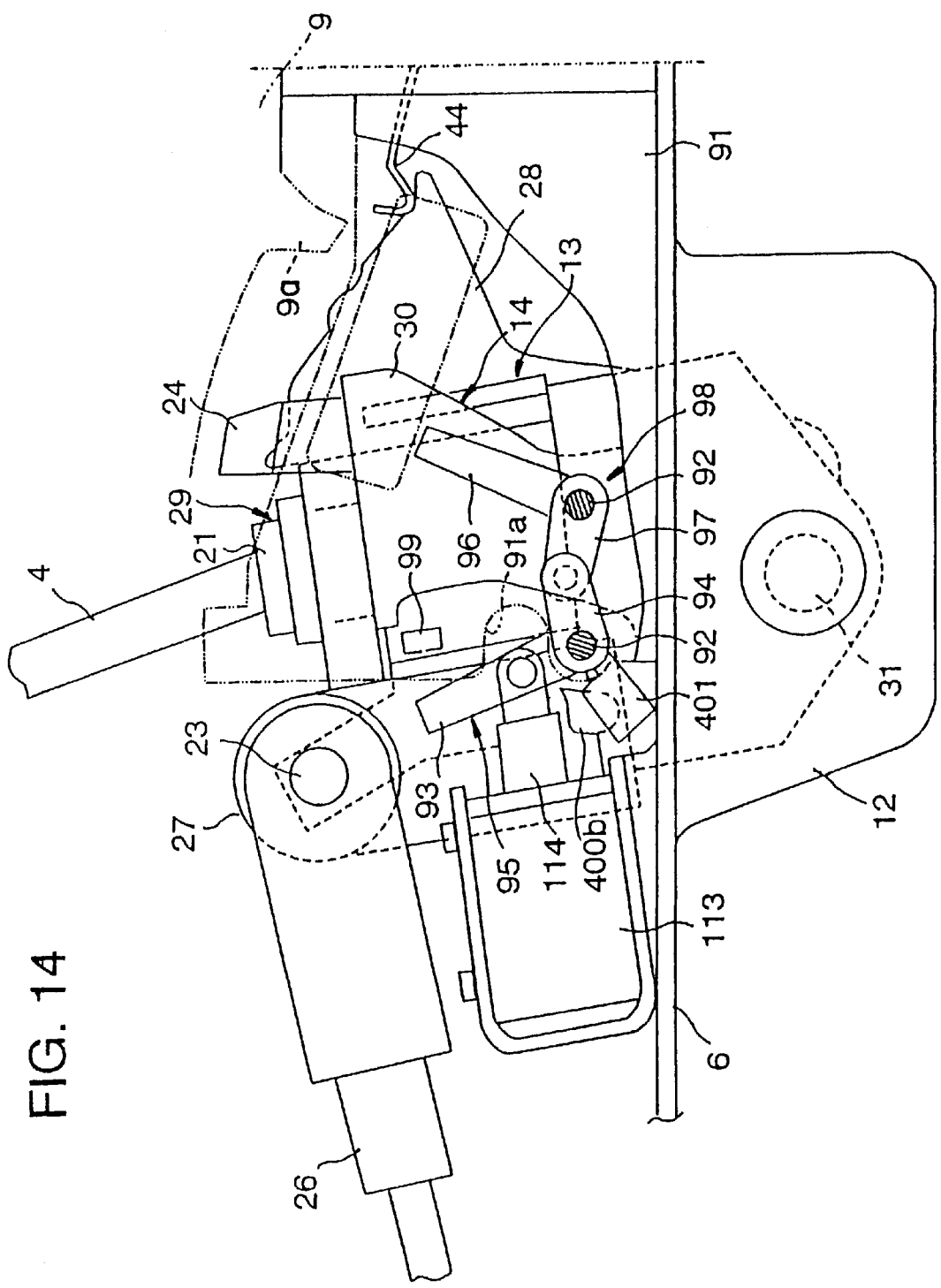
Figure 15:
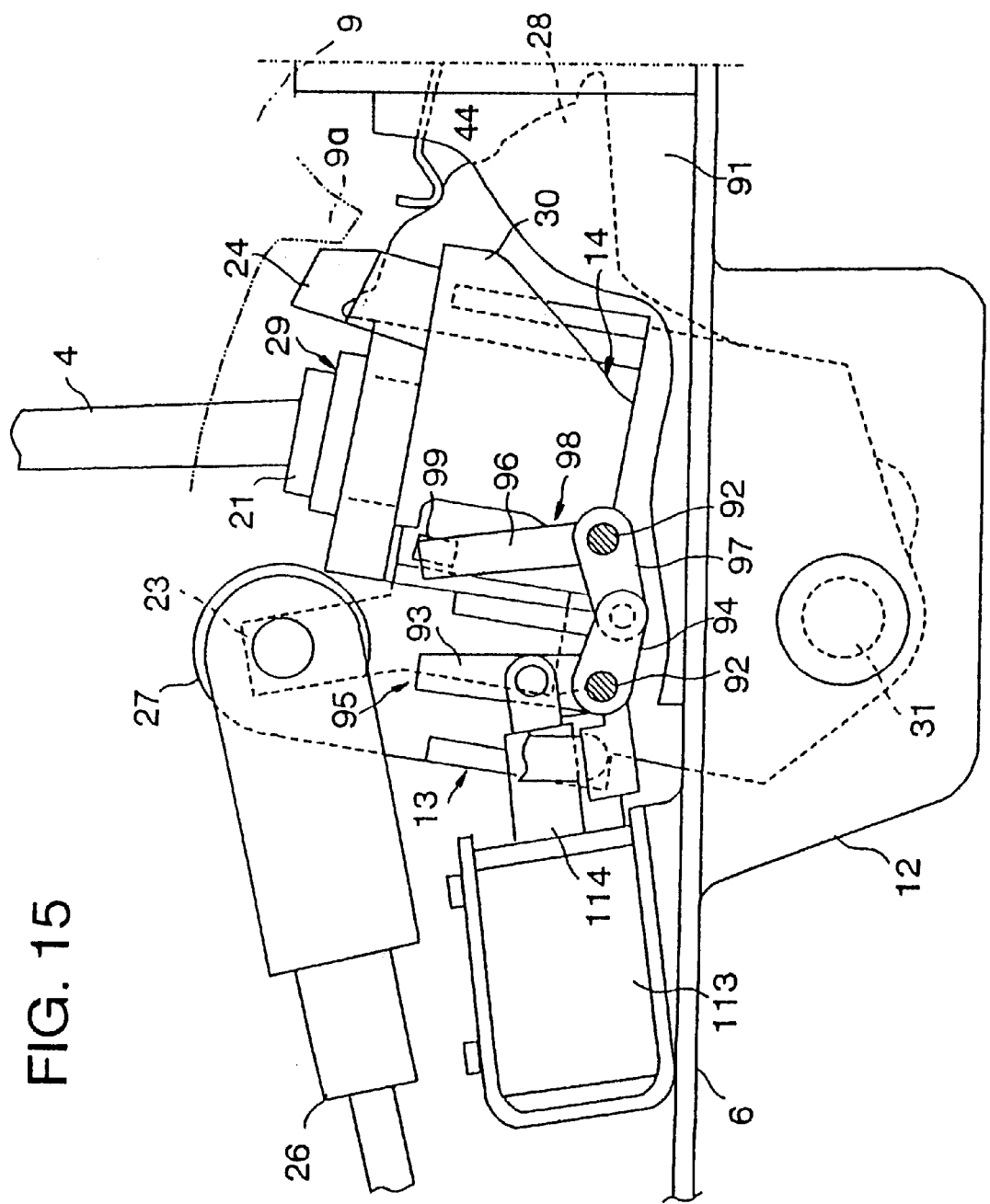
FIG. 15 is an explanatory view showing a structure and operation of the shift locking mechanism which is in a neutral (N) range.

This shift locking mechanism is structured such that the electromagnetic solenoid 113 is energized when the vehicle speed lowers below a specified speed while the shift lever 3 remains situated in the N range selecting position as well as when the foot brake pedal 111 is stepped on while the shift lever 3 remains situated in the P range selecting position. As shown in FIGS. 13 and 15, while the plunger 114 remains protruded with the link pin 114a within the semi-circular gate 91a of the side restraint wall 91, the vertical arm 93 of the front crank lever 95 is situated above the transverse slot section G1 of the shifting channel 15 and the vertical arm 96 of the rear crank lever 97 is situated above the transverse slot section G5 of the shifting channel 15. On the other hand, as shown in FIG. 14, while the plunger 114 remains retracted with the link pin 114a out of the semi-circular gate 91a of the side restraint wall 91, the vertical arm 93 of the front crank lever 95 is moved away from the transverse slot section G1 of the shifting channel 15 and the vertical arm 96 of the rear crank lever 97 is moved away from the transverse slot section G5 of the shifting channel 15. Accordingly, in the P range selecting position (FIGS. 13 and 14), the shift lever 3 can not swivel in the transverse direction unless the foot brake pedal 111 is stepped on, making the shift arrangement 1 impossible to select any other ranges. Since the shift lever 3 can not be swiveled in any direction from the N range selecting position (FIG. 15) unless the vehicle speed lowers below the specified speed, it is impossible to shift the automatic transmission to the R range via the N range even if attempting a countershift the automatic transmission to the R range during traveling. In particular, the combined operation of the shift lock in the P range and the key interlock prevents the engine from being started unless the shift lever 3 is situated in the P range selecting position and prevents the shift lever 3 from being shifted from the P range selecting position unless the foot brake pedal 111 remains stepped on. This eliminates accidental shooting of the vehicle.

In this instance, as shown in particular in FIGS. 6, and 13 to 15, the shift lever 3 is provided with a stopper 99 secured to the base member 5 thereof so as to be knockable against the vertical arms 93 and 96 of the front and rear crank levers 95 and 97. When the stopper 99 is brought into knocking against the vertical arm 93 or 96, the shift lever 3 is prevented to swivel. Since each of the front and rear crank levers 95 and 97 is supported on the side restraint wall 91 and each of the vertical arms 93 and 96 has a thickened wall section almost in contact with the side restraint wall 91 as shown in FIG. 6, although the crank lever 95, 97 receives the energy of an impact caused when the stopper 99 knocks against the vertical arm 93, 96, the crank lever 95, 97 is borne up by the side restraint wall 91 with an effect of eliminating a bend and/or damage of the vertical arm 93, 96 or providing an increase in durability of the crank lever 95, 97. The linked structure between the P range shift locking lever 95 and the N range shift locking lever 97 makes it possible to drive the P and N range shift locking levers 95 and 97 not by means of two independent electromagnetic solenoids but by means of a single electromagnetic solenoids 113, which is always desirable for lowering the overall weight of the shifting arrangement 1 and reducing the number of parts of the shifting arrangement 1.

The shifting cable disconnecting mechanism is hereafter described with referring to FIGS. 6 and 7. As was previously described, the second swivel bracket 14 supporting the second shaft 32 on which the shift lever 3 is directly mounted has left and right side walls 201 and 202. The side walls 201 and 202 extend on opposite sides of the shift lever 3 and cover the opposite sides of the square pillar 21 as a part of the lower base member 5 of the shift lever 3. Each of the left and right side walls 201 and 202 has generally T-shaped detent gates 29 at each top thereof. Each detent gate 29 is formed by front and rear detents t and a grooves k between the front and rear detents t. In this instance, the detent gate 29 of the right side wall 202 has an overall width in the lengthwise direction smaller than the detent gate 29 in the left side wall 201. Specifically, the width of the groove k of the detent gate 29 of the left side wall 201 and the distance between outer side surfaces of the front and rear detents t of the detent gate 29 of the right side wall 202 are approximately equal to each other and approximately equal to the width of the square pillar 21 of the lower base member 5 of the shift lever 3. As shown in FIGS. 6–8 and 17, a generally parallel-piped control block 203 having a square opening 204 is fitted in the detent gates 29. The square opening 204 comprises three sections 205, 206 and 207 having different widths in the lengthwise direction. The right opening section 205 (at the left in FIG. 17) has the narrowest width which is approximately equal to the width of the groove k of the detent gate 29 of the right side wall 202. The left opening section 207 (at the right in FIG. 17) has the broadest width which is approximately equal to the outer side surfaces of the distance between the front and rear detents t of the detent gate 29 of the left side wall 201. The intermediate opening section 206 has a width which is between the widths of the right and left opening sections 205 and 207 and is approximately equal to the width of the square pillar 21 of the lower base member 5 of the shift lever 3, the width of the groove k of the detent gate 29 of the left side wall 201 and the distance between the front and rear detents t of the detent gates 29 of the right side wall 202. The control block 203 at the intermediate opening section 206 is fitted by the square pillar 21 of the lower base member 5 of the shift lever 3 and can slide in the transverse direction in the second swivel bracket 14. The control block 203 receives the detents t of the detent gate 29 of the right side wall 202 in the intermediate opening section 206 and the detents t of the detent gate 29 of the left side wall 201 in the left opening section 207 when the control block 203 is slid to the right. With this structure, the control block 203 is always capable of sliding in the transverse direction relatively to both second swivel bracket 14 and shift lever 3 and, however, is always operationally integrated together with both second swivel bracket 14 and shift lever 3 in movement in the lengthwise direction. The control block 203 is always urged toward the left side restraint wall 91 by means of a biasing spring 210 disposed between the left side wall 201 of the second swivel bracket 14 and the inner wall of the control block 203. In this state, the square pillar 21 of the lower base member 5 of the shift lever 3 engages a shoulder 211 between the right and intermediate opening sections 205 and 206 of the control block 203, preventing the control block 203 from moving to the left under force applied by the biasing spring 210.

As shown in FIG. 8, the slide block 203 is forced to the right end position by the shift lever 3 through engagement between the shoulder 211 between the right and intermediate opening sections 205 and 206 and the square pillar 21 while the shift lever 3 is forced to and remains situated in the P, N or D range selecting position which is the extreme right end of the shifting channel 15. In this state, the left end of the slide block 203 is separated from but situated in close proximity to the side restraint wall 91 on which the front and rear crank levers 95 and 98 are supported by means of the pivot shafts 92. The shift cable disconnecting mechanism includes the push spring 210 between the slide block 203 and the left side wall 201 of the second swivel bracket 14. The push spring 210 is designed and adapted to urge the slide block 203 left with a transverse force which is weaker than a transverse force exerted on the slide block 203 from the left by the shift lever biasing mechanism. When the shift lever 3 is swiveled to the left in the transverse direction, the slide block 203 is forced by the push spring 210 following the transverse swivel movement of the shift lever 3 until it is stopped by the side restraint wall 91. As was previously described, at this time, the second swivel bracket 14 does not swivel in the transverse direction nor in the lengthwise direction. Even when the shift lever 3 is further swiveled to the left, the slide block 203 remains stopped by the side restraint wall 91 and, since the second swivel bracket 14 does not swivel in the transverse direction, it never compresses the push spring 210 nor exerts a strong transverse force to the side restraint wall 91 and the slide block 203. In other words, in this state, the transmission of transverse swivel movement of the shift lever 3 to the slide block 203 is disconnected.

As shown in FIGS. 7 and 8, the first swivel bracket 13 is formed with a thickened rear wall section 27 on the left side wall to which the shifting cable 26 is connected and a thickened front wall section as the sector-shaped extension 28 on the right side wall. Correspondingly to the thickened wall sections 27 and 28, the slide block 203 is integrally formed with left rear and right front extensions 220 and 221. The lengthwise distance between the rear and front extensions 220 and 221 is approximately equal to the lengthwise direction between outside surfaces of the thickened wall sections 27 and 28. While the slide block 203 is stopped by the side restraint wall 91, in other words, while the slide block 203 is situated left a little from the right end position, the rear and front extensions 220 and 221 of the slide block 203 meet the thickened wall sections 27 and 28 of the first swivel bracket 13, respectively. Accordingly, in this position, the slide block 203 is allowed to slide relatively to the first swivel bracket 13 in the transverse direction but prevented from sliding relatively to the first swivel bracket 13 in the lengthwise direction. When the shift lever 3 is swiveled in the lengthwise direction in this state, the first and second swivel brackets 13 and 14 and the slide block 203 are swiveled or moved as one whole in the lengthwise direction. In consequence, the shifting cable 26 connected to the first swivel bracket 13 is dragged by the first swivel bracket 13 following the lengthwise swivel movement of the shift lever 3 to operate the manual valve 301 of a hydraulic control circuit 300 (which will be described later in connection with FIG. 16) according to selected range positions.

Figure 16:
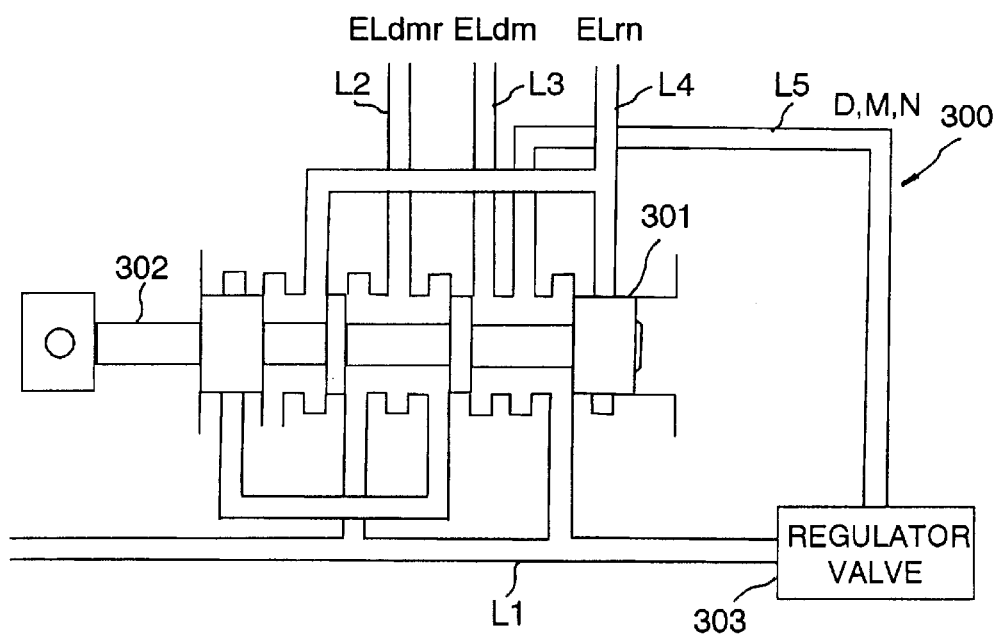
FIG. 16 is an explanatory view showing part of a hydraulic control system including a manual valve.

Referring to FIG. 16, the hydraulic control circuit 300 for a automatic transmission linked with the shifting arrangement 1 includes a manual valve 301 and a regulator valve 303. Operating hydraulic pressure developed by an oil pump (not shown) is regulated as a predetermined level of line pressure by the regulator valve 303 and delivered into a main pressure line L1. The hydraulic control circuit 300 has pressure lines L2–L5 leading to various friction coupling elements (not shown) such as brakes and clutches which are selectively locked and unlocked to place the automatic transmission in desired ranges and the manual valve 301 which has four range selecting spool position for P, R, N and D ranges. The pressure line L2 leads to a friction coupling element ELdmr operative to lock when the manual valve 301 is situated in any one of D, M and R range selecting positions. The pressure line L3 leads to a friction coupling element ELdm operative to lock when the manual valve 301 is situated in any one of D and M range selecting positions. The pressure line L4 leads to a friction coupling element ELrn operative to lock when the manual valve 301 is situated in any one of P, R and N range selecting positions. Specifically, when the shift lever 3 is in the D range selecting position or the M range selecting position, the manual valve 301 is situated in the D/M range selecting position (shown in FIG. 16) to bring the pressure lines L2 and L3 into communication with the main pressure line L1, so as to supply the line pressure as operating pressure to the friction coupling elements ELdmr and ELdm. When the shift lever 3 is swiveled in the lengthwise direction, the manual valve 301 shifts the spool 302 right or left. When the shift lever 3 is swiveled to the N range selecting position from the D range selecting position, the valve spool 302 is shifted to the right (shown in FIG. 16) to bring the pressure lines L4 and L5 into communication with the main pressure line L1, so as to supply the operating pressure to the friction coupling element ELrn and drain the pressure from the friction coupling elements ELdmr and ELdm. In the D, M and N ranges, the operating pressure is supplied to the pressure line L5 and fed back to the regulator valve 303 to lower the level of line pressure.

The hydraulic control circuit 300 provides proper communication of the pressure line L2–L5 with the main pressure line L1 in accordance with the range selecting positions of the manual valve 301.

Figure 17:
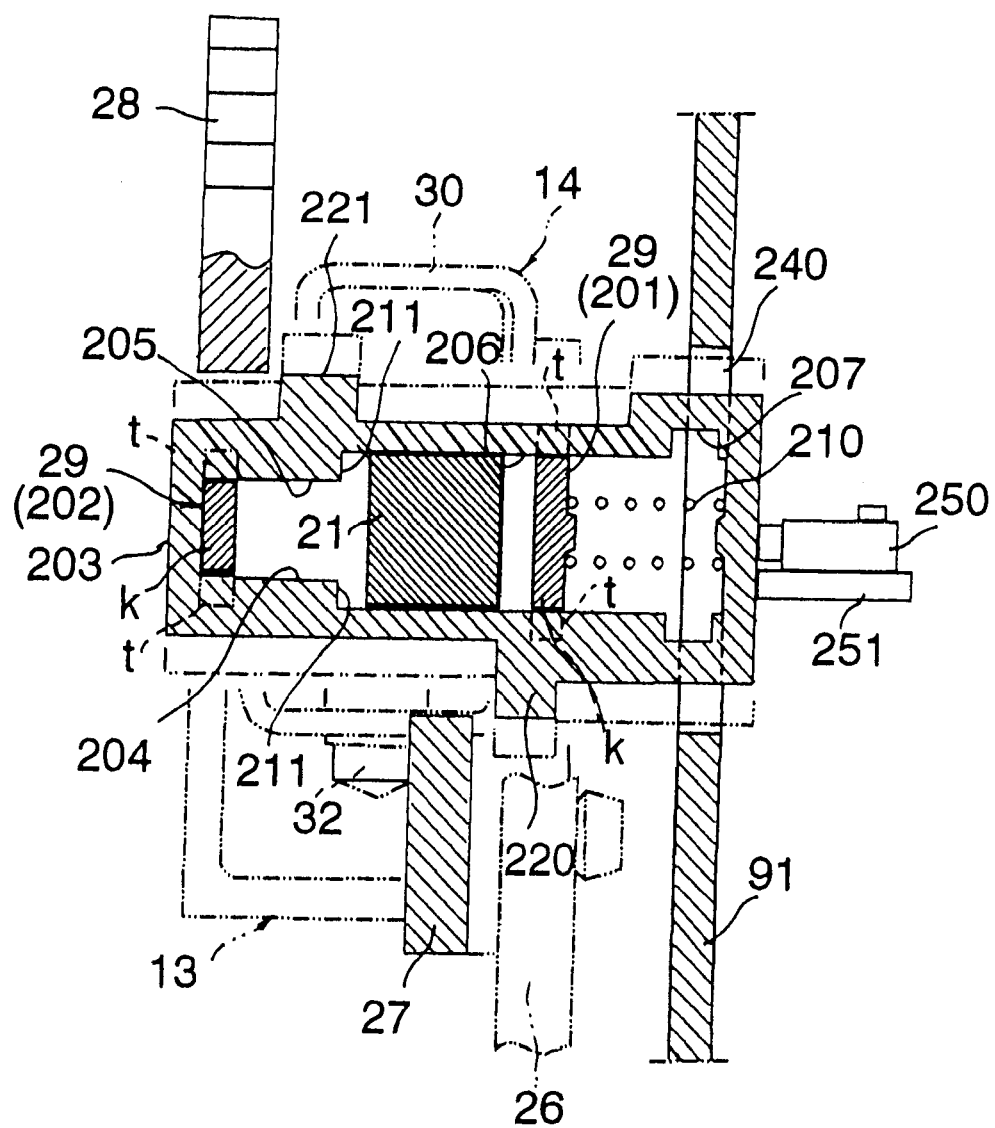
FIG. 17 is an explanatory view showing a structure and operation of a cable releasing mechanism.
Figure 18:
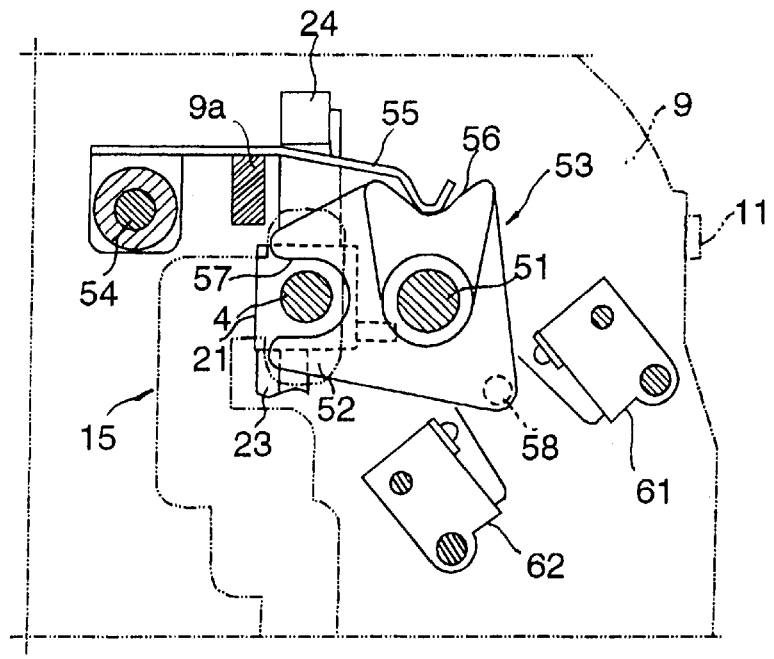
FIGS. 18 through 20 are an explanatory views of a structure and operation of a load bearing and switch actuating mechanism.
Figure 19:
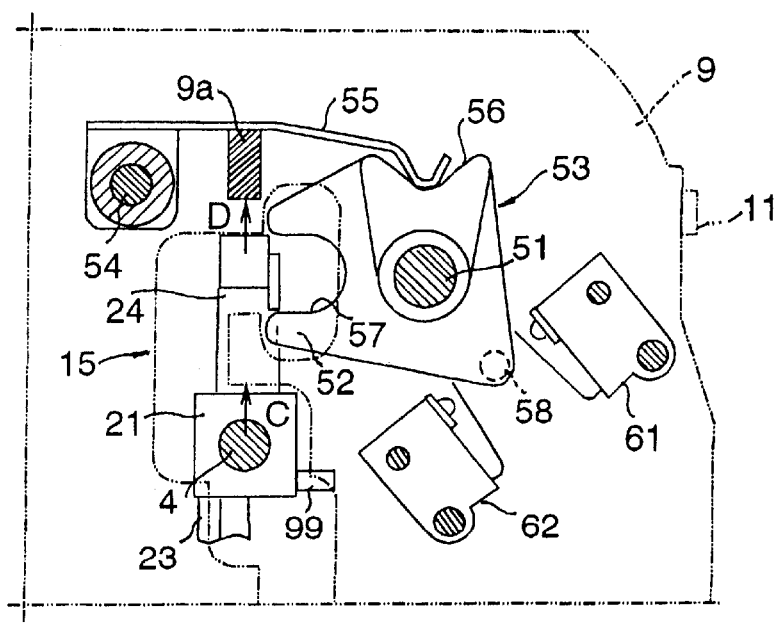
Figure 20:
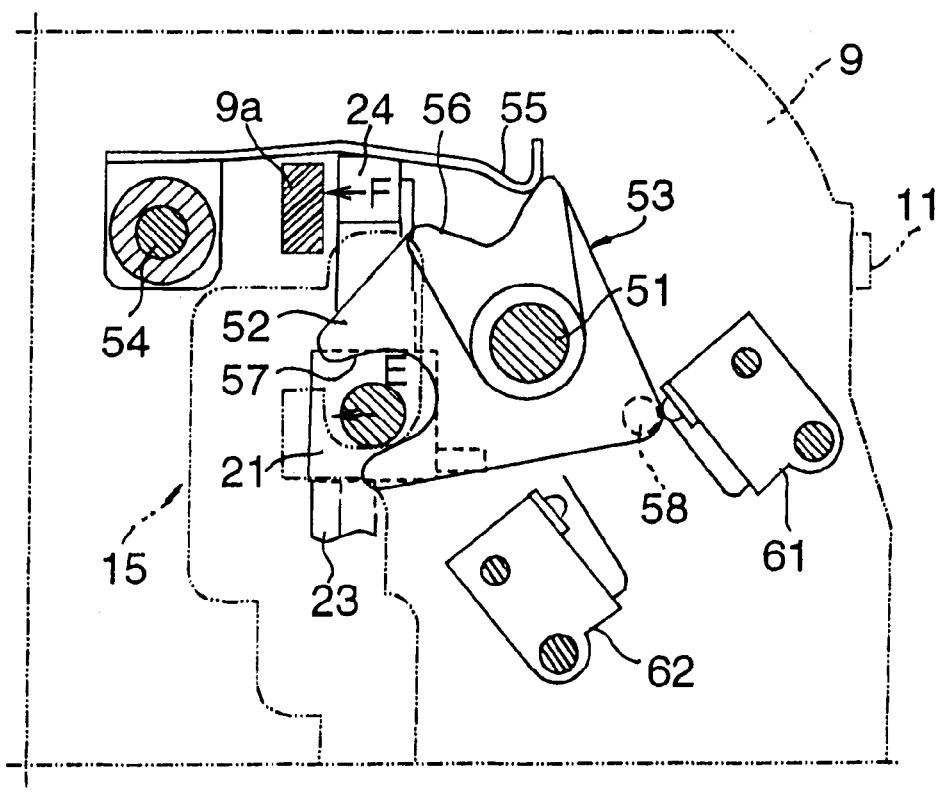

As shown in FIGS. 8 and 17, the side restraint wall 91 is formed with a large opening 240 positionally corresponding to a position which the slide block 203 occupies when the shift lever 3 is situated in the D range selecting position. In this position, since the slide block 203 is urged to the right by the shift lever biasing mechanism more strongly than to the left by the push spring 210, the slide block 203 remains out of the opening 240 of the side restraint wall 91 even when it moves to and is situated in front of the opening 240 following the lengthwise swivel movement of the shift lever 3 to the D range selecting position. However, when the shift lever 3 is swiveled against the transverse force exerted thereon by the shift lever biasing mechanism to the M range selecting position from the D range selecting position, the slide block 203 is slid to the left by the push spring to enter the opening 340 as shown in FIG. 17. In consequence, the slide block 203 puts its rear and front extensions 220 and 221 out of the thickened wall sections 27 and 28 of the first swivel bracket 13, respectively, so as to be uncoupled from the first swivel bracket 13. When the shift lever 3 is swiveled forward or rearward for a manual gear shift after situated in the M range selecting position, while the slide block 203 and the second swivel bracket 14 are forced in the same lengthwise direction all together with the shift lever 3, the first swivel bracket 13 and the shifting cable 26 connected to the first swivel bracket 13 are left immobile. As a result, even when the shift lever 3 situated in the M range selecting position is swiveled forward or rearward, no action is caused in the manual valve 301 and the hydraulic control circuit 300 remains in the D/M range mode without causing a drop in the operating pressure for the friction coupling elements. When the shift lever 3 returns to the D range selecting position from the M range selecting position, the square pillar 21 of the shift lever 3 runs against the slide block 203 at the shoulder 211 between the right and intermediate opening sections 205 and 206 and forces the slide block 203 to the right, situating the rear and front extensions 220 and 221 to be opposite to the thickened wall sections 27 and 28 of the first swivel bracket 13, respectively. Thereafter, the first swivel bracket 13 is coupled together with the shift lever 3 and the second swivel bracket 14. In this instance, since , while the shift lever 3 is in the M range selecting position in which the first swivel bracket 13 is uncoupled from the slide block 203, the first swivel bracket 13 is held in the D/M range selecting position by means of engagement between the sector-shaped extension 28 and the second leaf spring detent member 44, the slide block 203 is safely coupled together with the first swivel bracket 13 when the shift lever 3 is returned to the D range selecting position.

As shown in FIGS. 3, 7, 8 and 17, the side restraint wall 91 at its outer side is provided with a vertical wall 251 extending laterally left in close proximity to the opening 240. An M range switch 250 is secured to the vertical wall 251 so as to be pushed and actuated by the slide block 203 when the shift lever 3 is swiveled to the M range selecting position from the D range selecting position. In this instance, as shown in FIG. 17, the slide block 203 has the left end wall having a width in the lengthwise direction sufficiently broad to keep the M range switch 250 actuated even when the shift lever 3, and hence the slide block 203, swivels back and forth to make a manual gear shift step by step as shown by dotted broken line in FIG. 17.

As described above, the shifting cable disconnecting mechanism disconnects the linkage between the shift lever 3 and the shifting cable 26 only when the shift lever 3 is swiveled to the M range selecting position from the D range selecting position and connects the linkage again whenever the shift lever 3 is returned to the D range selecting position from the M range selecting position. Disconnection between the shift lever 3 and the shifting cable 26 is achieved by uncoupling the slide block 203 from the first swivel bracket 13 through transverse slide movement of the slide block 203 which is allowed only in the D/M range selecting position but prevented by the side restraint wall 91 in any range selecting position other than the D/M position. In this disconnected state, since the shift lever 3 is movable in the transverse direction relatively to the slide block 203, the shift lever 3 does not exert an excessive force directly on the control block 203 and on the side restraint wall 91 through the slide block 203 during transverse swivel movement. Accordingly, even when the shift lever 3 is swiveled all the way along the transverse slot section G1 of the shifting channel 15 before shifting to the R range selecting position from the P range selecting position, the slide block 203 does never enter the opening of the side restraint wall 91, keeping the shift lever 3 from being disconnected from the shifting cable 26. At this time, since the slide block 203 is supported at two points, i.e. at the left and right side walls 201 and 202, by the second swivel bracket 104, the slide block 203 is prevented from bending even if it knocks against the side restraint wall 91 or the first swivel bracket 13 and, as a result, receives a bending stress about the shift lever 3. The coupling structure between the slide block 203 and the second swivel bracket 14, which comprises the right and left detent gates 29 and the square opening 204 of the slide block 203 consisting of three different widths of opening sections 205–207, provides an improved efficiency in assembling the slide lock 203 into the shifting arrangement 1.

Referring to FIGS. 4, 15 and 18 to 20, an impact restraint mechanism comprises the rear buffer arm 24 extending from and off the upper back of the rear wall of the square pillar 21 and a counter arm 9a extending downward from the upper panel 9 and apart rearward from the rear buffer arm 24. As was previously described, the shift lever 3 is restrictively swiveled along the lengthwise and transverse slot sections G1–G9 of the shifting channel 15 in the upper panel 9. Whenever the shift lever 3 is brought into and knocks against the extreme end of a slot section of the shifting channel 15, it exerts an impact on the upper panel 9. For this reason, the upper panel 9 must have sufficient durability to withstand countless impacts against the slot sections by the shift lever 3. As shown in FIG. 2, In the shifting arrangement 1, the shifting channel 15 comprises a slot shaped in a zig-zag fashion with an effect of laying out the slot section G4 between the R range selecting position and the N range selecting position and the slot section G8 extending from the M range selecting position for a manual step by step up shift in close proximity to each other. Further, the shifting channel 15 is provided with the M range selecting position, as the result of which the slot section G6 between the N range selecting position and the D range selecting position and the slot sections G8 and G9 extending from the M range selecting position are laid out in parallel to each other in the lengthwise direction in which the shift lever 3 is swiveled to shift ranges and gears. Accordingly, part of the upper panel 9 defined by the slot sections G5–G8 of the shifting channel 15 has a configuration which gradually narrows toward the N range selecting position. This cramped weak part of the upper panel 9 is hit from every direction by the shift lever 3, which possibly causes a significant aggravation of durability of the upper panel 9 around the shifting channel 15. However, in order to improve the durability of the upper panel 9, the shifting arrangement 1 has the impact restraint mechanism designed and adapted such that the rear buffer arm 24 at its lower end knocks, on one hand, against the front end of the counter arm 9a as shown by an arrow D in FIG. 19 when the upper steel rod 4 of the shift lever 3 comes to knock against a front edge of the cramped part of the upper panel 9 defined by the shifting channel 15 as shown by an arrow C in FIG. 19 during swivel movement of the shift lever 3 from the R range selecting position to the N range selecting position and, on the other hand, against the side of the counter arm 9a as shown by an arrow F in FIG. 20 when the upper steel rod 4 of the shift lever 3 comes to knock against a left side edge of the cramped part of the upper panel 9 defined by the shifting channel 15 as shown by an arrow F in FIG. 20 during transverse swivel movement of the shift lever 3 from the M range selecting position to the D range selecting position.

With the impact restraint mechanism, impacts exerted against the edge of the cramped part of the upper panel 9 defined by the shifting channel 15 by the shift lever are dispersed with an effect of improving the durability of the upper panel 9. Because the buffer arm 24 and the counter arm 9a are installed to the shift lever 3 and upper panel 9 formed with the shifting channel 15, respectively, it is easy to arrange these buffer arm 24 and counter arm 9a accurately in relative position so that, in order to effectively disperse impacts, the counter arm 9a and the upper panel 9 are simultaneously hit by the shift lever 3 at the upper steel rod 4 and the buffer arm 24, respectively. Further, the buffer arm 24 passes by the side of the counter arm 9a without interfering the same during an N to D range shift and passes by the rear of the counter arm 9a without interfering the same during an D to M range shift.

The cramped weak part of the upper panel 9 surrounded by the slot sections G5–G8 of the shifting channel 15 is possibly subjected to pressure in the transverse direction not only by transverse leaning motion of the shift lever 3 in the course of lengthwise swivel movement of the shift lever 3 between the R range selecting position and the N range selecting position or during a stay of the shift lever 3 in an upper end position of the lengthwise slot section G8 at a conclusion of a manual up-shift but also absurd transverse motion of the shift lever 3 in the course of lengthwise swivel movement of the shift lever 3 between the N range selecting position and the D range selecting position, or absurd lengthwise motion of the shift lever 3 in the course of lengthwise swivel movement of the shift lever 3 from the D range selecting position toward the M range selecting positionor vice versa. However, in the shifting arrangement 1, these absurd motion of the shift lever 3 are hard to occur because, although they are assumed to result from a driver's unintentional action in the middle of shift movement of the shift lever 3, the sector-shaped extension 28 is under sliding engagement of a rise between the notched gates (p, r, n, d) by the second leaf spring detent member 44. Even in this event, the buffer arm 24 and counter arm 9a knock against each other, preventing the upper panel 9 from being subjected to pressure, which is always desirable for improving the durability of the of the upper panel 9. It is effective in increasing the durability of the upper panel 9 to strengthen the cramped weak part with, for example, a metal reinforcement.

The shifting arrangement is provided with a spring loaded push rod 400 (see FIGS. 1–3, 6 and 14) operative to intentionally bring the front and rear crank levers 95 and 98 supported on the side restraint wall 91 into their released position when the shift locking mechanism is made unable to be released due, for example, to operational failures of the solenoid 113 or a lock of the plunger 114 of the solenoid. As shown in FIG. 3, the push bar 400 extends vertically in a casing 402 and has a push knob 400a exposing to the outside of the shifting arrangement 1. As shown in FIG. 6, the push rod 400 extends to and engages at its lower end 400b with an extension 401 extending in the transverse direction to the outside of the side restraint wall 91 from the front crank levers 95. When the push rod 400 is pushed down, the front crank levers 95 is turned through the engagement between the extension 401 and the lower end 400b in a direction in which the front crank levers 95 is turned by the energized solenoid 113. In consequence, the front and rear crank levers 95 and 98 bring their vertical arm 93 and 96 into their shift lock releasing positions, respectively. Since a space outside of the side restraint wall 91 is sufficiently spacious as compared with a space inside of the side restraint wall 91 where a number of mechanisms and their associated parts, the extension 401 and the lower end 400b disposed in the outside space is advantageous in terms of the degree of arrangement of the push rod 400, enabling the push knob 400a to be located in a position convenient for operation by the driver.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A shift select lever device for an automatic transmission having a shift lever pivoted on a stationary base member to swivel in first and second directions perpendicular to each other for selecting a plurality of automatic driving positions including at least an automatic gear shift selecting position in which said automatic transmission is automatically shifted to forward gears according to scheduled shift patterns and a manual gear shift selecting position in which said automatic transmission is shifted one gear step-by-step, said shift lever being swiveled in said first direction to select said driving positions, swiveled in said second direction to switch between said manual gear shift selecting position and said automatic gear shift selecting position, and further swiveled in said first direction in said manual gear shift selecting position to manually shift said automatic transmission one gear step-by-step, characterized by:

a valve operative to control a hydraulic control circuit according to said driving positions;

a shifting cable installed between said shift lever and said valve operative to transfer swivel movement of said shift lever in said first direction to said valve;

a control member separate from said shift lever and movable in said second direction between a connecting position in which said control member connects said transfer of swivel movement of said shift lever in said first direction to said valve and a disconnecting position in which said control member disconnects said transfer of swivel movement of said shift lever in said first direction to said valve, said shift lever being movable relative to said control member in said second direction when said control member is in said connecting position; and a restraint member operative to hold said control member in said connecting position while said shift lever is moved to select drive positions other than said automatic gear shift selecting position and said manual gear shift selecting position and to allow said control member to move between said disconnecting position and said connecting position following swivel movement of said shift lever in said second direction between said manual gear shift selecting position and said automatic gear shift selecting position;

wherein a path in which said shift lever moves between each adjacent positions to select one of said drive positions other than said manual gear shift selecting position and said automatic gear shift selecting position partly includes a path section extending in said second direction and partly overlapping a path in said first direction in which said shift lever moves between said automatic gear shift selecting position and said manual gear shift selecting position.

2. The shift select lever device as defined in claim 1, and further characterized by position detection means which is actuated by movement of said control member to said disconnecting position for detecting said shift lever in said manual gear shift selecting position.

3. The shift select device as defined in claim 1, wherein said control member comprises a slidable member supported by and movable in said second direction relatively to said shift lever, and said restraint member, which is secured to said base member, is abutted by said control member to restrain slide movement of said control member in said second direction when said shift lever is swiveled in said second direction from one to another of said positions other than said automatic gear shift selecting position and said manual gear shift selecting position so as to cause movement of said control member relative to said shift lever, thereby holding said control member in said connecting position, and lets said control member pass through said restraint member and move in said second direction when said shift lever is swiveled in said second direction between said automatic gear shift selecting position and said manual gear shift selecting position.

4. The shift select lever device as defined in claim 3, and further comprising biasing means for urging said control member toward said manual gear shift selecting position from said automatic gear shift selecting position and restraint means provided on said shift lever for preventing movement of said control member toward said manual gear shift selecting position against said biasing means, wherein said control member is moved to said disconnecting position following swivel movement of said shift lever in said second direction to said manual gear shift selecting position from said automatic gear shift selecting position and to said connecting position following swivel movement of said shift lever in said second direction to said automatic gear shift selecting position from said manual gear shift selecting position.

5. The shift select lever device as defined in claim 3, and further comprising first swivel bracket means supported by said base member for swiveling in said first direction only, second swivel bracket means supported by said first swivel bracket means for swiveling relatively to said first swivel bracket means in said second direction and a shift cable fixedly connected to said first swivel bracket means, wherein said shift lever and said control member are supported by said first swivel bracket means separately from each other so as to swivel relatively to said second swivel bracket means in said second direction and swivel together with said second swivel bracket means in said first direction, and said control member is supported at a plurality of points in said second direction by said second swivel bracket means.

6. The shift select lever device as defined in claim 5, wherein said second swivel bracket means is provided with a first risen wall section and a second risen wall section narrower in width than said first risen wall section, said control member is formed with a first opening in which said first risen wall section is received to slide in said second direction and a second opening narrower than said first opening and extending continuously from said first opening in said second direction in which said first risen wall section is received to slide in said second direction.

7. The shift select lever device as defined in claim 3, and further comprising a first swivel bracket pivotally supported on said base member to swivel relatively to said base member in said first direction, a second swivel bracket pivotally supported on said first swivel bracket to swivel relatively to said first swivel bracket in said second direction and supporting separately said sift lever and said control member thereon in such a manner that said shift lever and said control member are always operationally integrated with said second swivel bracket in said first direction but allowed to separately swivel and slide relatively to said first and second swivel brackets in said second direction, respectively, and a shift cable fixedly connected to said first swivel bracket, wherein said control member couples said first swivel bracket together with said second swivel bracket together while being in said connecting position so that said shift lever, said control member and said first and second swivel brackets swivel as one whole in said first direction.

8. The shift select lever device as defined in claim 1, and further comprising a shifting channel for guiding swivel movement of said shift lever in said first and second directions to situate said shift lever in said driving positions including a parking range selecting position, a reverse range selecting position and a neutral range selecting position in addition to said automatic gear shift selecting position and in said manual gear shift selecting position, wherein said shifting channel defines said parking range selecting position, said neutral range selecting position and said automatic gear shift selecting position in a same position in said second direction and in that order in said first direction, and said reverse range selecting position between said automatic gear shift selecting position and said manual gear shift selecting position in said second direction and between said parking range selecting position and said neutral range selecting position in said first direction, and includes a guide path extending in said second direction from said reverse range selecting position and having a length equal to a distance between said automatic gear shift selecting position and said manual gear shift selecting position for guiding said shift lever in said second direction before situating said shift lever in said parking range selecting position.

9. A shift select lever device for an automatic transmission having a shift lever pivoted on a stationary base member to swivel in first and second directions perpendicular to each other for selecting a plurality of driving positions including at least an automatic gear shift selecting position in which said automatic transmission is automatically shifted to forward gears according to scheduled shift patterns and a manual gear shift selecting position in which said automatic transmission is shifted one gear step-by-step, said shift lever being swiveled in said first direction to select said driving positions, swiveled in said second direction to switch between said manual gear shift selecting position and said automatic gear shift selecting position and further swiveled in said first direction in said manual gear shift selecting position to manually shift said automatic transmission one gear step by step, characterized by:

a valve operative to control a hydraulic control circuit according to said driving positions and said manual gear shift selecting position;

a shifting cable installed between said shift lever and said valve operative to transfer swivel movement of said shift lever in said first direction to said valve;

a control member separate from said shift lever and movable in said second direction between a connecting position in which said control member connects said transfer of swivel movement of said shift lever in said first direction to said valve and a disconnecting position in which said control member disconnects said transfer of swivel movement of said shift lever in said first direction to said valve, said shift lever being movable relative to said control member in said second direction when said control member is in said connecting position; and position detection means for detecting said shift lever in said manual gear shift selecting position;

wherein said control member is kept in said connecting position while said shift lever selects positions other than said automatic gear shift selecting position and said manual gear shift selecting position and is moved to said disconnecting position following swivel movement of said shift lever in said second direction to said manual gear shift selecting position from said automatic gear shift selecting position and to said connecting position following swivel movement of said shift lever in said second direction to said automatic gear shift selecting position from said manual gear shift selecting position, and said position detection means is actuated by movement of said control member to said disconnecting position to detect said shift lever.

10. A shift select lever device for an automatic transmission having a shift lever pivoted on a stationary base member to swivel in first and second directions perpendicular to each other for selecting a plurality of driving positions including at least an automatic gear shift selecting position in which said an automatic transmission is automatically shifted to forward gears according to scheduled shift patterns and a manual gear shift selecting position in which said automatic transmission is shifted one gear step-by-step, said shift lever being swiveled in said first direction to select said driving positions, swiveled in said second direction to switch between said manual gear shift selecting position and said automatic gear shift selecting position and further swiveled in said first direction in said manual gear shift selecting position to manually shift said automatic transmission, one gear step-by-step, characterized by:

a shifting channel for guiding swivel movement of said shift lever in said first and second directions to situate said shift lever in said driving positions including a parking range selecting position, a reverse range selecting position and a neutral range selecting position in addition to said automatic gear shift selecting position and in said manual gear shift selecting position, said shifting channel defining said reverse range selecting position, said neutral range selecting position and said automatic gear shift selecting position in a same position in said second direction and in that order in said first direction, and said reverse range selecting position between said automatic gear shift selecting position and said manual gear shift selecting position in said second direction and between said parking range selecting position and said neutral range selecting position in said first direction and including a guide path which extends in said second direction from said parking range selecting position and has a length equal to a distance between said automatic gear shift selecting position and said manual gear shift selecting position to guide said shift lever in said second direction before situating said shift lever in said parking range selecting position;

a valve operative to control a hydraulic control circuit according to said driving positions and said manual gear shift selecting position;

a shifting cable installed between said shift lever and said valve operative to transfer swivel movement of said shift lever in said first direction to said valve; and a control member movable between a connecting position in which said control member connects said transfer of swivel movement of said shift lever in said first direction to said valve and a disconnecting position in which said control member disconnects said transfer of swivel movement of said shift lever in said first direction to said valve;

wherein said control member is kept in said connecting position while said shift lever selects positions other than said automatic gear shift selecting position and said manual gear shift selecting position and is moved to said disconnecting position following swivel movement of said shift lever in said second direction to said manual gear shift selecting position from said automatic gear shift selecting position and to said connecting position following swivel movement of said shift lever in said second direction to said automatic gear shift selecting position from said manual gear shift selecting position, and said control member is prohibited from moving in said second direction while being situated in any one of said positions other than said automatic gear shift selecting position and said manual gear shift selecting position.

* * * * *